US012562471B2

(12) United States Patent
Xu et al.

(10) Patent No.: US 12,562,471 B2
(45) Date of Patent: Feb. 24, 2026

(54) ELECTRONIC DEVICES WITH DYNAMIC ANTENNA SWITCHING

(71) Applicant: Apple Inc., Cupertino, CA (US)

(72) Inventors: Yuancheng Xu, San Jose, CA (US); Thomas E Biedka, San Jose, CA (US); Jingni Zhong, Santa Clara, CA (US); Hongfei Hu, Cupertino, CA (US); Simran Singh, San Francisco, CA (US); Allen S Kwon, San Jose, CA (US); Carlo Di Nallo, Belmont, CA (US); Jayesh Nath, Santa Clara, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 17/947,006

(22) Filed: Sep. 16, 2022

(65) Prior Publication Data

US 2024/0097324 A1 Mar. 21, 2024

(51) Int. Cl.

| | |
|---|---|
| ***H01Q 3/24*** | (2006.01) |
| ***H01Q 1/24*** | (2006.01) |
| ***H01Q 5/35*** | (2015.01) |
| ***H01Q 5/378*** | (2015.01) |

(52) U.S. Cl.

CPC ............... *H01Q 3/24* (2013.01); *H01Q 1/241* (2013.01); *H01Q 5/35* (2015.01); *H01Q 5/378* (2015.01)

(58) Field of Classification Search

CPC ........ H01Q 3/24; H01Q 3/2605; H01Q 1/241; H01Q 1/243; H01Q 5/35; H01Q 5/378; H01Q 5/328; H01Q 5/335; H01Q 9/42; H01Q 21/28

See application file for complete search history.

(56) References Cited

U.S. PATENT DOCUMENTS

| | | | | |
|---|---|---|---|---|
| 7,834,813 B2 * | 11/2010 | Caimi | .................... | H01Q 9/045 343/745 |
| 9,369,187 B1 | 6/2016 | Sammeta et al. | | |
| 9,705,180 B2 | 7/2017 | Darnell et al. | | |
| 10,056,695 B2 | 8/2018 | Ayala Vazquez et al. | | |

(Continued)

FOREIGN PATENT DOCUMENTS

| | | | | |
|---|---|---|---|---|
| CA | 2680939 A1 * | 3/2010 | ......... | A61B 18/1815 |
| KR | 20120108019 A * | 10/2012 | ........... | H04B 7/0691 |
| KR | 20240005558 A * | 1/2024 | ............... | H04B 1/50 |

*Primary Examiner* — Seokjin Kim

(74) *Attorney, Agent, or Firm* — Treyz Law Group, P.C.; Michael H. Lyons

(57) ABSTRACT

An electronic device may be provided with a first antenna fed by a first path and a second antenna fed by a second path. A first coupler may be disposed on the first path, a second coupler may be disposed on the second path, and a feedback path may couple the couplers to a receiver. A low-pass filter may be disposed on the second path. The first antenna may transmit signals in a low band. Some of the signals may couple onto the second antenna. The second coupler may pass the coupled signals to the receiver. Control circuitry may generate a scattering parameter value characterizing the coupling of the signals from the first antenna onto the second antenna. The scattering parameter value may be used to determine when to switch the first antenna out of use and the second antenna into use for covering the low band.

16 Claims, 10 Drawing Sheets

(56) References Cited

U.S. PATENT DOCUMENTS 10,128,874 B2 * 11/2018 Khlat ........................ H01P 5/18
10,158,384 B1 12/2018 Yarga et al.
10,243,624 B2 3/2019 Kim et al.
10,312,571 B2 6/2019 Edwards et al.
10,355,344 B1 * 7/2019 Ruaro ...................... H01Q 3/24
10,403,964 B2 9/2019 Yoo et al.
10,476,170 B2 11/2019 Rajagopalan et al.
10,693,516 B2 6/2020 Han et al.
10,804,617 B2 * 10/2020 Zhou ...................... H01Q 1/243
11,088,452 B2 8/2021 Avser et al.
11,139,588 B2 10/2021 Edwards et al.
11,228,345 B1 * 1/2022 Wang ....................... H04B 5/24
2011/0250926 A1 * 10/2011 Wietfeldt ............... H01Q 1/243 455/525
2013/0234741 A1 * 9/2013 Mow ...................... H01Q 5/328 324/750.01
2013/0257667 A1 * 10/2013 Kang ..................... G01C 21/26 333/124
2013/0328582 A1 * 12/2013 Han ..................... H01Q 9/0442 324/750.01
2015/0318610 A1 * 11/2015 Lee .......................... H01Q 3/34 375/267
2016/0097833 A1 * 4/2016 Han ....................... H01Q 1/243 343/702
2016/0126618 A1 * 5/2016 Strange .................. H01Q 1/241 343/861
2016/0308276 A1 10/2016 Chang et al.
2017/0356980 A1 * 12/2017 Islam ....................... H01Q 3/24
2018/0294547 A1 * 10/2018 Park ......................... H01Q 9/42
2020/0127742 A1 * 4/2020 Seong ...................... H04B 1/18
2021/0217713 A1 * 7/2021 Wallis ..................... H03F 3/245
2022/0006198 A1 1/2022 Edwards et al.
2022/0158686 A1 * 5/2022 Beaudin ................. H03H 7/463
2024/0006770 A1 * 1/2024 Rodríguez ............. H01Q 1/243
2024/0097801 A1 * 3/2024 Spits ...................... H04B 17/14

* cited by examiner

ELECTRONIC DEVICES WITH DYNAMIC ANTENNA SWITCHING

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating conditions that can otherwise detune the antennas.

SUMMARY

An electronic device may be provided with wireless circuitry and a housing having peripheral conductive housing structures. The wireless circuitry may include first and second antennas. The first antenna may have a resonating element arm formed from a first segment of the peripheral conductive housing structures. The second antenna may have a resonating element arm formed from a second segment of the peripheral conductive housing structures. The first antenna may be fed by a first radio-frequency path coupled to the first segment. The second antenna may be fed by a second radio-frequency path coupled to the second segment.

A first signal coupler may be disposed on the first radio-frequency path. A second signal coupler may be disposed on the second radio-frequency path. A feedback receiver may be coupled to the first and second signal couplers over a feedback path. A low-pass filter may be disposed on the second radio-frequency path between the second antenna and the second signal coupler. A low-pass filter may be disposed on the first radio-frequency path between the first signal coupler and a first terminal of a switch. The switch may have a second terminal coupled to the second radio-frequency path and a third terminal coupled to a transceiver.

The transceiver may transmit radio-frequency signals in a cellular low band (LB) over the first radio-frequency path and the first antenna. Some of the radio-frequency signals may be coupled onto the second antenna. The second signal coupler may pass a portion of the coupled signal to the feedback receiver. One or more processors may generate a scattering parameter value such as a complex transmission coefficient that characterizes the amount of coupling of the radio-frequency signals from the first antenna onto the second antenna. The one or more processors may use the scattering parameter value to switch the first antenna out of use and the second antenna into use for transmission of radio-frequency signals in the cellular LB. Other scattering parameter values such as reflection coefficients may be gathered and used to tune the antennas.

An aspect of the disclosure provides an electronic device. The electronic device can include peripheral conductive housing structures having a first segment and a second segment separated from the first segment by a dielectric-filled gap. The electronic device can include a first antenna fed by a first transmission line path coupled to the first segment. The electronic device can include a second antenna fed by a second transmission line path coupled to the second segment. The electronic device can include a first signal coupler disposed on the first transmission line path. The electronic device can include a second signal coupler disposed on the second transmission line path. The electronic device can include a feedback receiver coupled to the first signal coupler and the second signal coupler by a feedback path. The electronic device can include a low-pass filter disposed on the second transmission line path between the second signal coupler and the second antenna.

An aspect of the disclosure provides wireless circuitry. The wireless circuitry can include a first antenna. The wireless circuitry can include a first radio-frequency path coupled to the first antenna. The wireless circuitry can include a second antenna. The wireless circuitry can include a second radio-frequency path coupled to the second antenna. The wireless circuitry can include radio-frequency transceiver circuitry. The wireless circuitry can include a double-pole double throw (DPDT) switch having a first terminal, a second terminal, and a third terminal, the first terminal being coupled to the radio-frequency transceiver circuitry, the second terminal being coupled to the first radio-frequency path, and the third terminal being coupled to the second radio-frequency path. The wireless circuitry can include a low-pass filter disposed on the second radio-frequency path between the third terminal and the second antenna.

An aspect of the disclosure provides a method of operating an electronic device. The method can include with a first antenna, transmitting a radio-frequency signal in a frequency band. The method can include with a signal coupler disposed on a transmission line path coupled to a second antenna, conveying, to a feedback receiver, a portion of the radio-frequency signal that has coupled onto the second antenna from the first antenna. The method can include with the feedback receiver, generating a scattering parameter value based on the portion of the radio-frequency signal conveyed by the signal coupler. The method can include with one or more processors, adjusting the first antenna and the second antenna based on the scattering parameter value.

DETAILED DESCRIPTION

Figure 1:
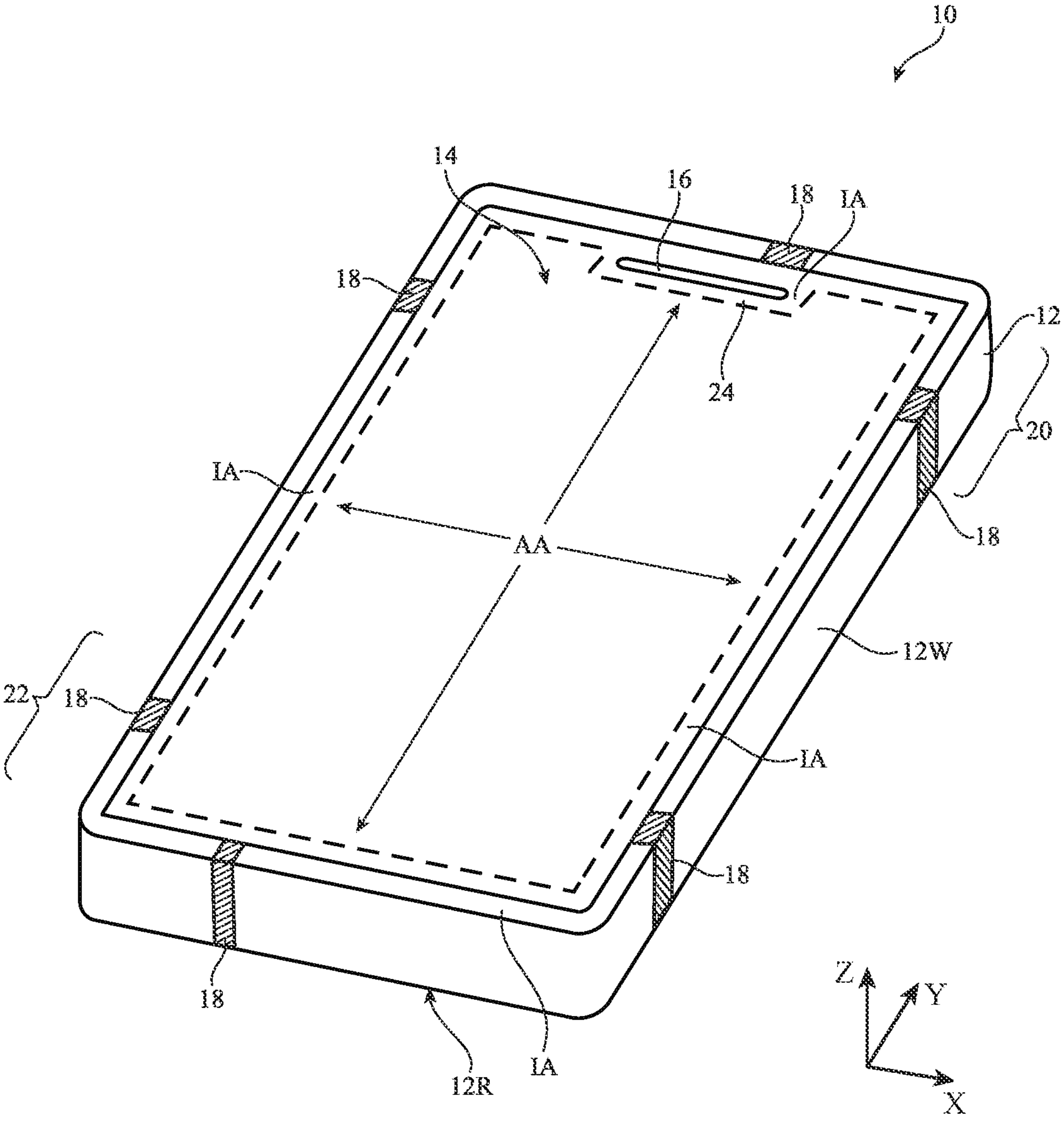
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
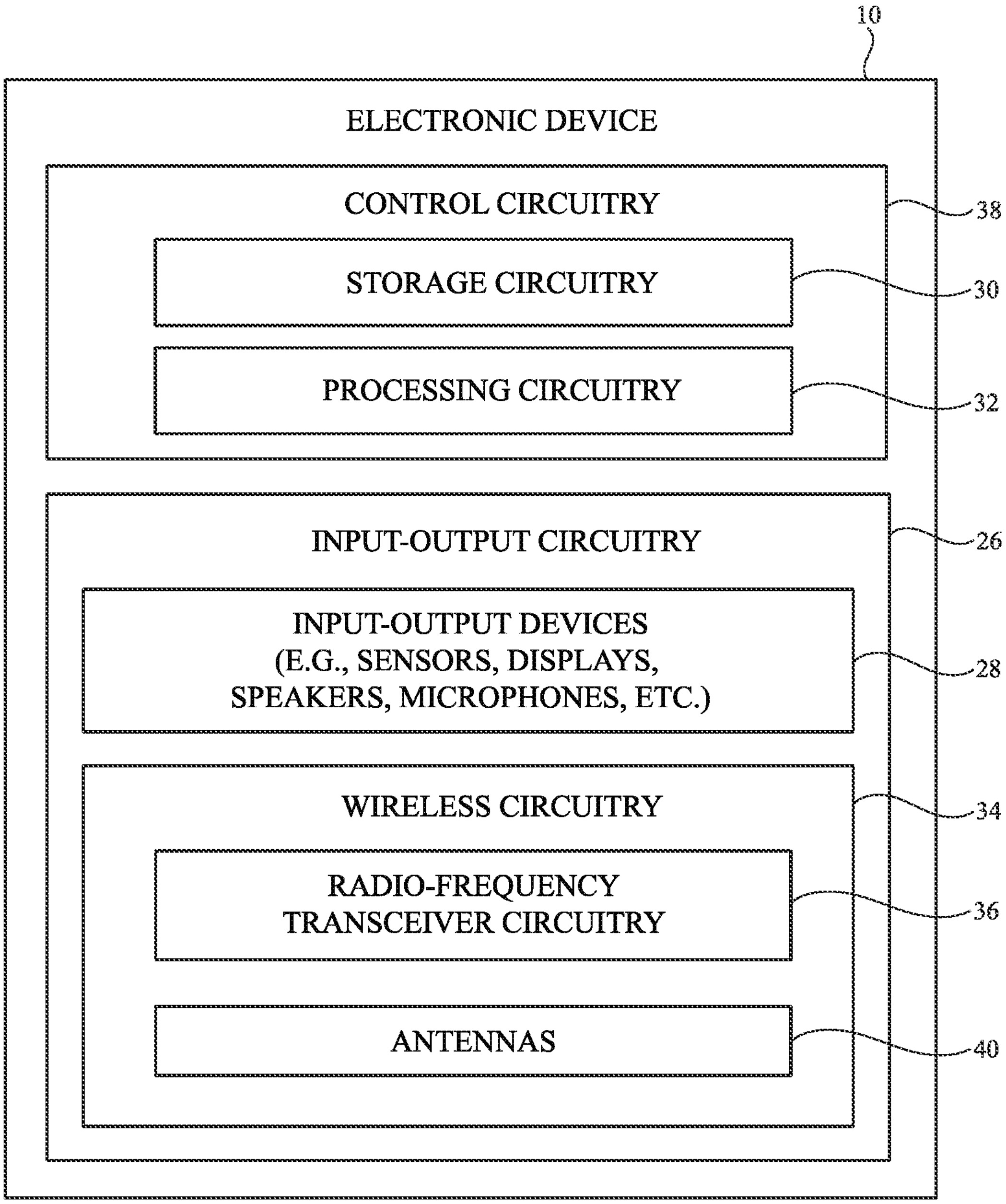
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
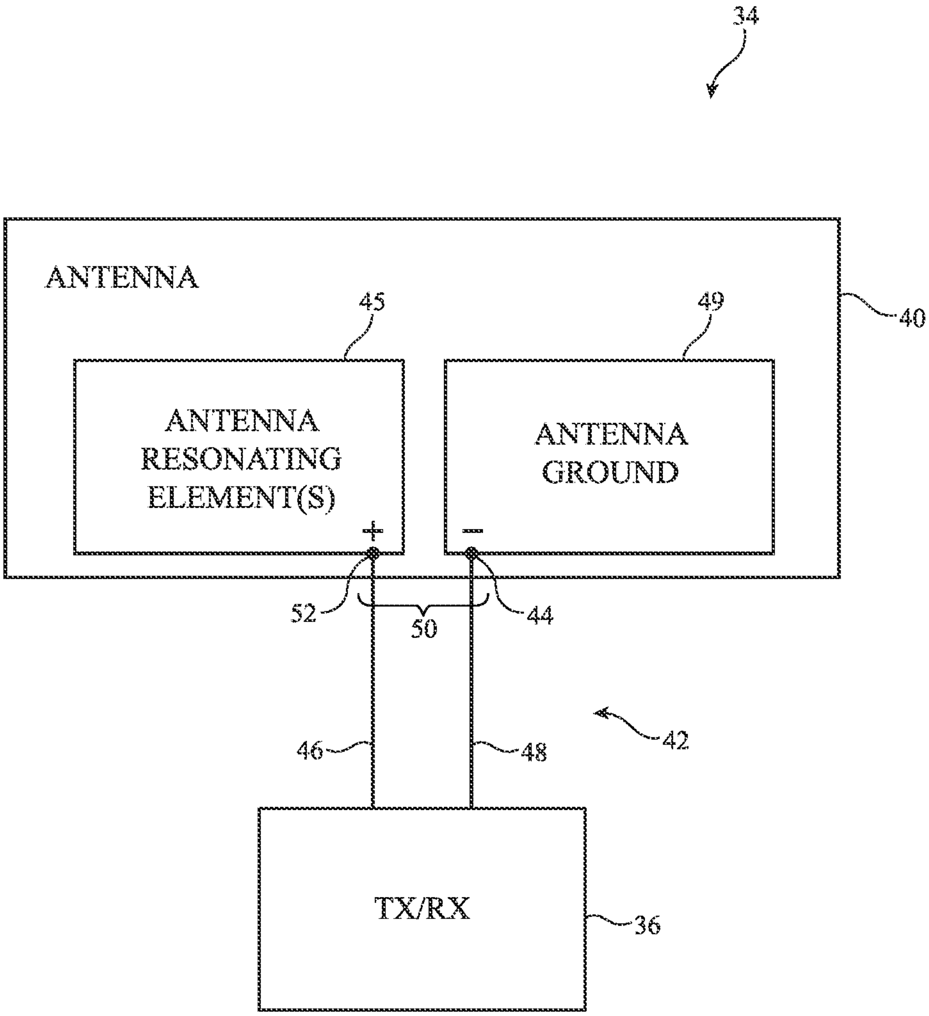
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
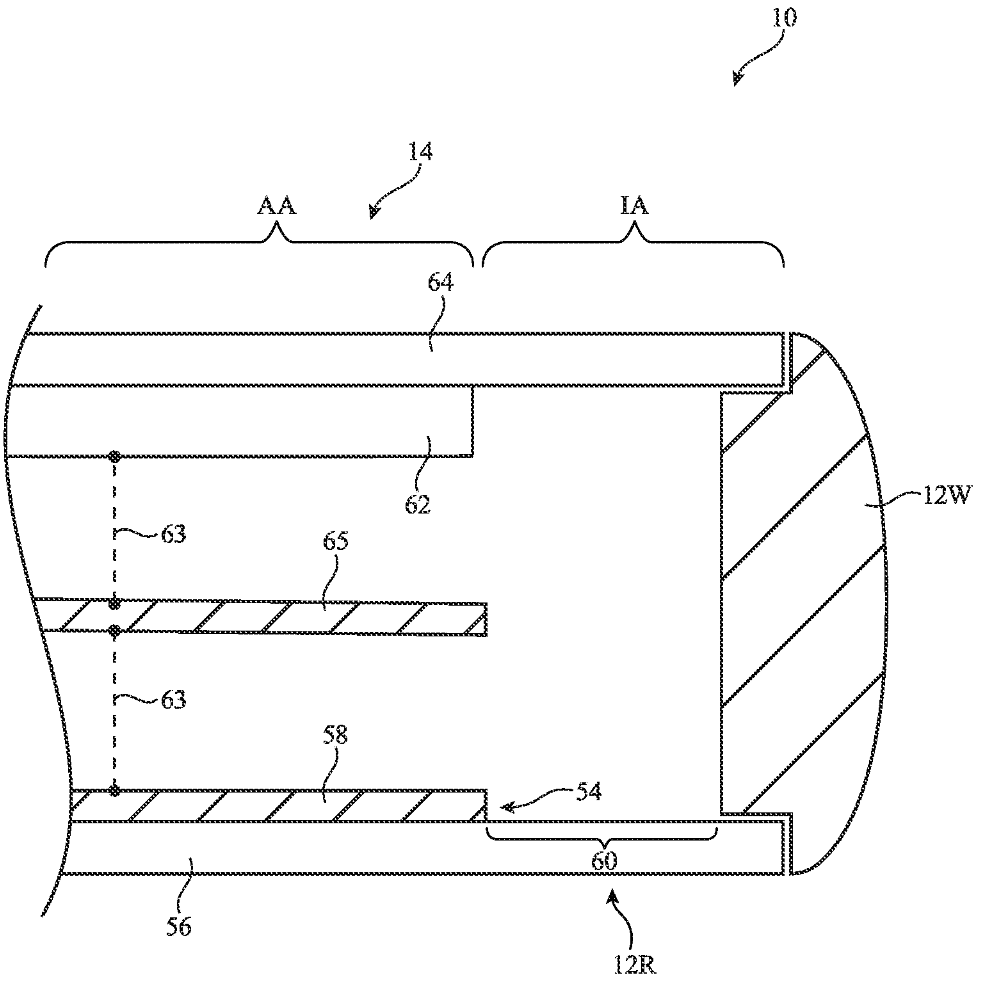
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
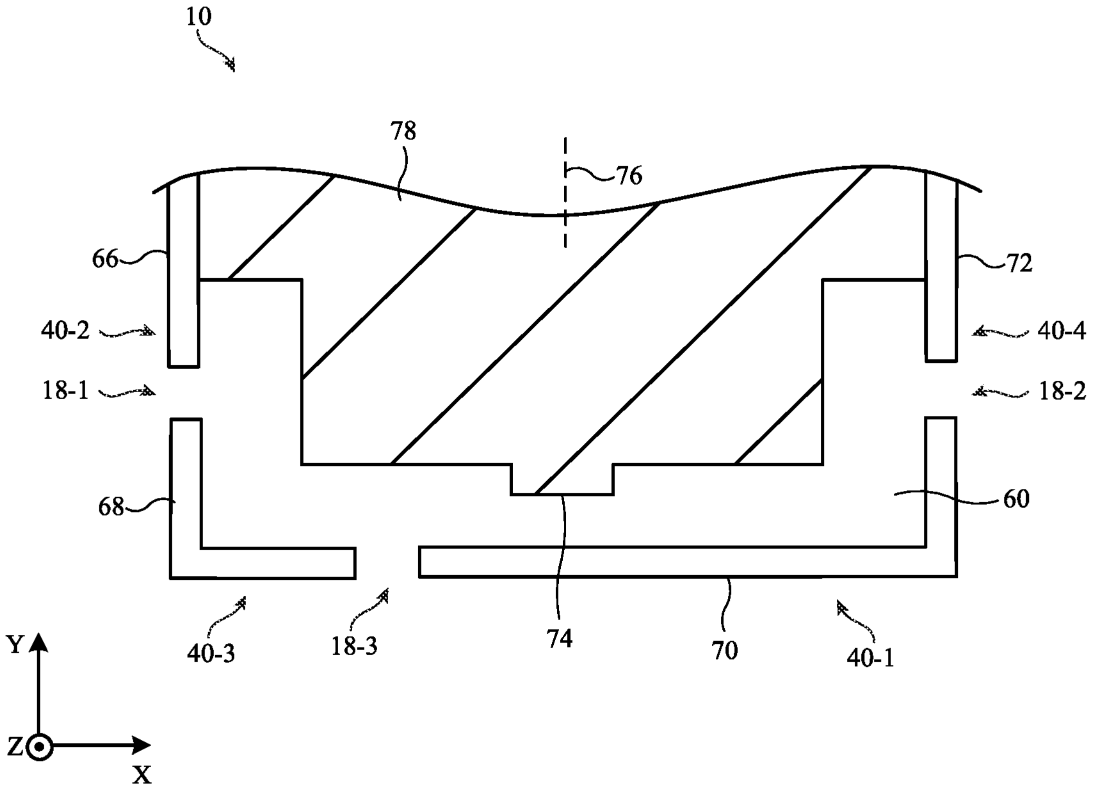
FIG. 5 is a top interior view of the lower end of an illustrative electronic device having peripheral conductive housing structures with a dielectric gap for separating the resonating elements of two antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment

70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as a metal layer used to form a rear housing wall and/or an internal support structure for device 10 (e.g., conductive support plate 58 of FIG. 4), conductive traces on a printed circuit board, conductive portions of one or more components in device 10, conductive portions of display module 62 (FIG. 4), conductive interconnect structures that couple two or more of these structures together (e.g., conductive pins, conductive adhesive, welds, conductive tape, conductive foam, conductive springs, etc.), etc.

Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Ground structures 78 may include a ground extension 74 that protrudes into slot 60 and that may, if desired, bridge slot 60 and couple the ground structures to the peripheral conductive housing structures. Ground extension 74 may be formed from a data connector for device 10. Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include an antenna 40-3 (sometimes referred to herein as ANT3) having an antenna resonating (radiating) element formed from segment 68 and having an antenna ground formed from ground structures 78. Device 10 may include an antenna 40-1 (sometimes referred to herein as ANT1) having an antenna resonating element formed from segment 70 and having an antenna ground formed from ground structures 78. Device 10 may include an antenna 40-2 having a slot antenna resonating element formed from a portion of slot 60 between segment 66 and ground structures 78. Device 10 may include an antenna 40-4 having a slot antenna resonating element formed from a portion of slot 60 between segment 72 and ground structures 78. Antennas 40-1 and 40-3 may be, for example, inverted-F antennas having a return path that couples the respective resonating element arms to the antenna ground. Antennas 40-1, 40-2, 40-3, and 40-4 may convey radio-frequency signals in one or more frequency bands. For example, antennas 40-1 and 40-3 may convey radio-frequency signals in at least the cellular low band (LB), the cellular midband (MB), and the cellular high band (HB). This may allow antennas 40-1 and 40-3 to perform MIMO communications in one or more of these bands, thereby maximizing data throughput.

In the example of FIG. 5, segment 68 has less overall length than segment 70 (e.g., longitudinal axis 76 of device 10 runs through segment 70 but not segment 68). It can therefore be difficult to configure antenna 40-3 to cover relatively low frequencies with the same antenna efficiency as antenna 40-1, such as frequencies within the cellular low band. In addition, ground extension 74 may have a relatively large size, such as in scenarios where ground extension 74 is formed from a relatively large data connector such as a data connector that supports data transfer using a USB-C protocol (e.g., a USB-C connector or port). The presence of ground extension 74 may also make it difficult for one or both of antennas 40-1 and 40-3 to cover the cellular low band.

Figure 6:
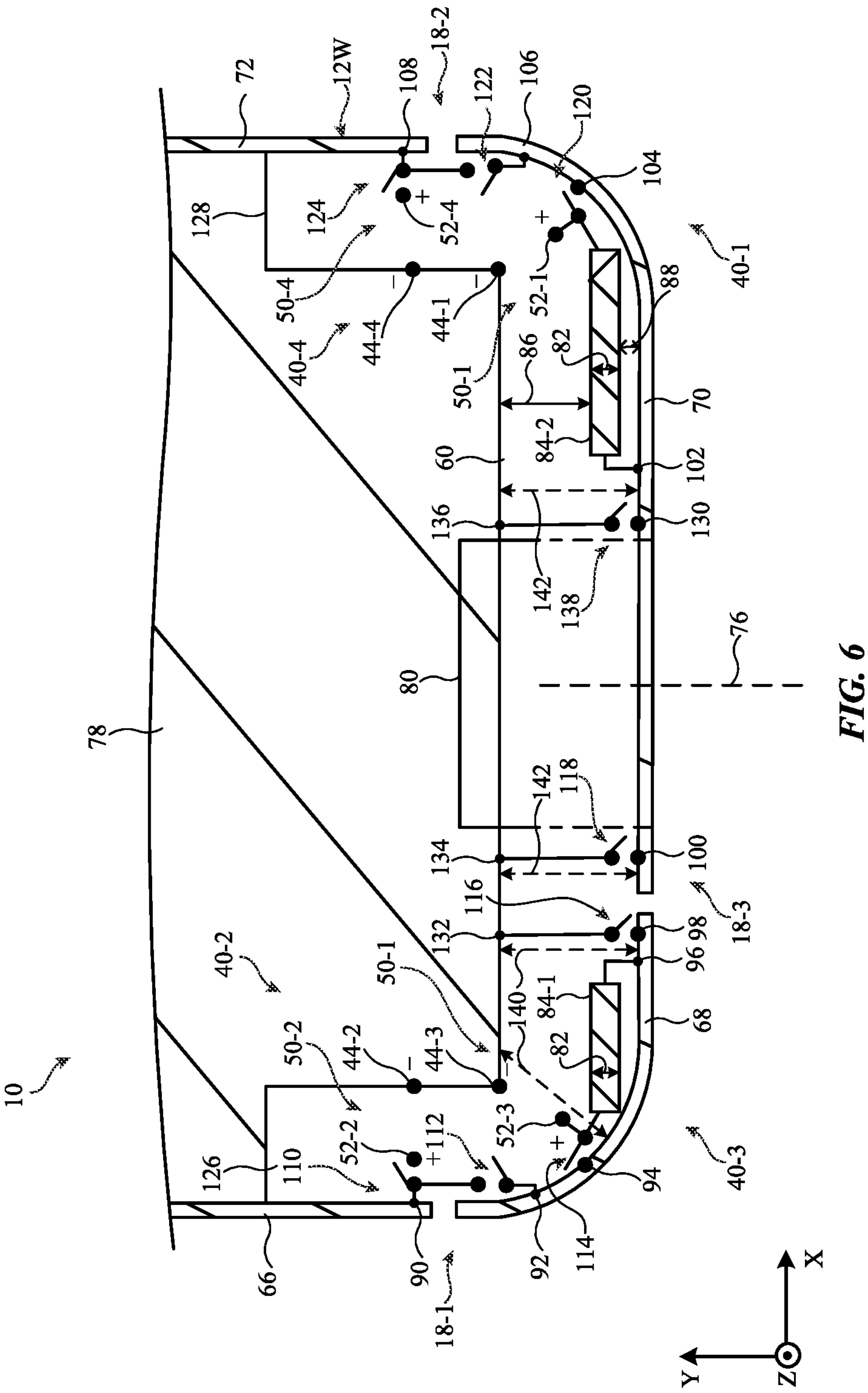
FIG. 6 is a top interior view of the lower end of an illustrative electronic device having first and second antennas that are separated by a dielectric gap and that may selectively cover a cellular low band in accordance with some embodiments.

FIG. 6 is an interior view showing how antennas 40-1 and 40-3 may be configured to overcome these challenges to both cover relatively low frequencies such as frequencies within the cellular low band. As shown in FIG. 6, antenna 40-3 may have an antenna resonating element arm formed from segment 68 of peripheral conductive housing structures 12W. Antenna 40-3 may be fed using an antenna feed 50-3 coupled across slot 60. Antenna feed 50-3 may have a positive antenna feed terminal 52-3 coupled to segment 68 and may have a ground antenna feed terminal 44-3 coupled to ground structures 78. Positive antenna feed terminal 52-3 may be switchably coupled to point (terminal) 94 on segment 68 by a switching circuit such as switch 114. Antenna 40-3 may have a return path formed from switchable component 116 coupled between point (terminal) 132 on ground structures 78 and point (terminal) 98 on segment 68. Switchable component 116 may sometimes be referred to herein as an adjustable component or a tuning element. Point 98 may be located at or adjacent to dielectric gap 18-3, for example. Switchable component 116 may include one or more switches, inductors, resistors, and/or capacitors.

Slot 60 may include a vertical portion that extends parallel to longitudinal axis 76 (e.g., the Y-axis of FIG. 6) and beyond gap 18-1. As shown in FIG. 6, slot 60 may include an extended (elongated) portion 126. Extended portion 126 of slot 60 may extend between segment 66 and ground structures 78 (e.g., segment 66 and ground structures 78 may define opposing edges of extended portion 126), parallel to longitudinal axis 76 and the Y-axis. Extended portion 126 of slot 60 may have an open end at gap 18-1 and an opposing closed end formed from ground structures 78. Extended portion 126 of slot 60 may sometimes be referred to herein simply as slot 126. Slot 126 may form a slot antenna resonating element for antenna 40-2. Antenna 40-2 may be fed by antenna feed 50-2 coupled across slot 126. Antenna feed 50-2 may include a positive antenna feed terminal 52-2 coupled to segment 66 and a ground antenna feed terminal 44-2 coupled to ground structures 78.

Positive antenna feed terminal 52-2 may be switchably coupled to point (terminal) 90 on segment 66 by a switching circuit such as switch 110. Point 90 may be located at or adjacent to gap 18-1. Point 90 may also be coupled to point (terminal) 92 on segment 68 via a switching circuit such as switch 112 (e.g., switch 112 may bridge gap 18-1). Point 92 may be located at or adjacent to gap 18-1. Switch 110 may be opened (e.g., turned off to create an open circuit or infinite impedance between positive antenna feed terminal 52-2 and both points 90 and 92) to deactivate antenna feed 50-2 and antenna 40-2. When switch 110 is opened, switch 112 may be closed (e.g., turned off to create a short circuit impedance between points 92 and 90) to extend the radiating volume of antenna 40-3 to include at least some of slot 126, if desired. Switch 112 may, for example, be toggled to tune the frequency response of antenna 40-3 in one or more bands. When switch 110 is closed, antenna feed 50-2 and antenna 40-2 may be active to radiate in one or more frequency bands. If desired, switch 112 may be opened when switch 110 is closed. Switch 110 and/or switch 112 may include one or more inductive, resistive, capacitive, and/or switches arranged in any desired manner for tuning the frequency response of antennas 40-2 and/or 40-3, if desired.

While positive antenna feed terminal 52-3 is coupled to a first location on segment 68 (e.g., point 94) via switch 114, positive antenna feed terminal 52-3 may also be coupled to a second location on segment 68 such as point (terminal) 96 via conductive trace 84-1 overlapping slot 60. The structure of antennas 40-1 and 40-4 may mirror the structure of antennas 40-3 and 40-2 about longitudinal axis 76, respectively, despite the fact that segment 70 is longer than segment 68. As shown in FIG. 6, antenna 40-1 may have an antenna resonating element arm formed from segment 70 of peripheral conductive housing structures 12W. Antenna 40-1 may be fed using an antenna feed 50-1 coupled across slot 60. Antenna feeds 50-1 and 50-3 may be coupled to and fed by respective transmission lines (e.g., transmission line 42 of FIG. 3). Antenna feed 50-1 may have a positive antenna feed terminal 52-1 coupled to segment 70 and may have a ground antenna feed terminal 44-1 coupled to ground structures 78. Positive antenna feed terminal 52-1 may be switchably coupled to point (terminal) 104 on segment 70 by a switching circuit such as switch 120. Antenna 40-1 may have one or more return paths such as a first return path formed from switchable component 118 coupled between point (terminal) 134 on ground structures 78 and point (terminal) 100 on segment 68 and optionally a second return path formed from switchable component 138 coupled between point (terminal) 136 on ground structures 78 and point (terminal) 130 on segment 70. Switchable components 118 and 138 may sometimes be referred to herein as adjustable components or tuning elements. Switchable components 116 and 138 may include one or more switches, inductors, resistors, and/or capacitors. Point 100 may be located at or adjacent to gap 18-3, for example.

A data connector such as data connector 80 may pass over slot 60 and through an opening in segment 70 (e.g., at the exterior of the device). Data connector 80 may be used to receive a mating data connector to charge a battery on device 10 and/or to convey data between device 10 and an external device. Data connector 80 may be a USB-C connector, for example. Points 100 and 130 may be located on opposing sides of data connector 80, for example. Longitudinal axis 76 of device 10 may pass through (e.g., bisect) data connector 80.

Slot 60 may include a vertical portion that extends parallel to longitudinal axis 76 (e.g., the Y-axis of FIG. 6) and beyond gap 18-2. As shown in FIG. 6, slot 60 may include an extended (elongated) portion 128. Extended portion 128 of slot 60 may extend between segment 72 and ground structures 78 (e.g., segment 72 and ground structures 78 may define opposing edges of extended portion 128), parallel to longitudinal axis 76 and the Y-axis. Extended portion 128 of slot 60 may have an open end at gap 18-2 and an opposing closed end formed from ground structures 78. Extended portion 128 of slot 60 may sometimes be referred to herein simply as slot 128. Slot 128 may form a slot antenna resonating element for antenna 40-4. Antenna 40-4 may be fed by antenna feed 50-4 coupled across slot 128. Antenna feed 50-4 may include a positive antenna feed terminal 52-4 coupled to segment 72 and a ground antenna feed terminal 44-4 coupled to ground structures 78.

Positive antenna feed terminal 52-4 may be switchably coupled to point (terminal) 108 on segment 72 by a switching circuit such as switch 124. Point 108 may be located at or adjacent to gap 18-2. Point 108 may also be coupled to point (terminal) 106 on segment 70 via a switching circuit such as switch 122 (e.g., switch 122 may bridge gap 18-2). Point 106 may be located at or adjacent to gap 18-2. Switch 124 may be opened to deactivate antenna feed 50-4 and antenna 40-4. When switch 124 is opened, switch 122 may be closed to extend the radiating volume of antenna 40-1 to include at least some of slot 128, if desired. Switch 122 may, for example, be toggled to tune the frequency response of antenna 40-2 in one or more bands. When switch 124 is closed, antenna feed 50-4 and antenna 40-4 may be active to radiate in one or more frequency bands. If desired, switch 122 may be opened when switch 124 is closed. Switch 124 and/or switch 122 may include one or more inductive, resistive, capacitive, and/or switches arranged in any desired manner for tuning the frequency response of antennas 40-1 and/or 40-4, if desired.

While positive antenna feed terminal 52-1 is coupled to a first location on segment 70 (e.g., point 104) via switch 120, positive antenna feed terminal 52-1 may also be coupled to a second location on segment 70 such as point (terminal) 102 via conductive trace 84-2 overlapping slot 60. The length of the resonating element arm of antenna 40-1 (segment 70) may be selected so that antenna 40-1 radiates at desired operating frequencies such as frequencies in a cellular low band (e.g., a frequency band between about 600 MHz and 960 MHz), a cellular low-midband (e.g., a frequency band between about 1410 MHz and 1510 MHz), a cellular midband (e.g., a frequency band between about 1710 MHz and 2170 MHz), and/or a cellular ultra-high band (e.g., a frequency band between about 3400 MHz and 3600 MHz).

For example, the length of segment 70 extending from point 104 to gap 18-3 and/or the length of segment 70 extending from point 104 to gap 18-2 may be selected to cover frequencies in the cellular low-midband, the cellular midband, the cellular high band, and/or the cellular ultra-high band (e.g., in a fundamental and/or harmonic mode(s)). In the fundamental mode, these lengths may be approximately equal to one-quarter of the wavelength corresponding to a frequency in the frequency band of interest (e.g., where the wavelength is an effective wavelength that accounts for dielectric loading by the dielectric materials in slot 60). Antenna 40-1 may cover these bands when switch 120 is closed to couple positive antenna feed terminal 52-1 to point 104, for example. If desired, switch 120 may decouple positive antenna feed terminal 52-1 from conductive trace 84-2 when coupling positive antenna feed terminal 52-1 to point 104.

The length of segment 70 between gaps 18-3 and 18-2 (or some subset thereof) may be selected to cover relatively low frequencies such as frequencies in the cellular low band. For example, this length may be selected to be approximately equal to one-quarter of the effective wavelength corresponding to a frequency in the cellular low band. Feeding antenna 40-1 at point 104 (e.g., by closing switch 120) may limit the length of segment 70 that is available to cover the low band. In addition, operations at relatively low frequencies such as frequencies in the low band may be particularly susceptible to loading by data connector 80, which is relatively large. This may limit antenna efficiency at frequencies in the low band. Such undesirable loading may be mitigated by using portions of segment 70 that are located farther from data connector 80 and gap 18-3 to cover the low band.

To optimize performance within the low band, switch 120 may be opened and positive antenna feed terminal 52-1 may be coupled to point 102 via conductive trace 84-2. Segment 70 may then be fed via conductive trace 84-2 at point 102. Point 102 may therefore sometimes be referred to herein as a positive antenna feed terminal when switch 120 is open. Opening switch 120 to couple positive antenna feed terminal 52-1 to point 102 may serve to shift electromagnetic hotspots in the cellular low band away from gap 18-3 and data connector 80 and towards gap 18-2. This may serve to minimize loading in the low band by data connector 80, as well as by external objects such as the user's body, thereby maximizing antenna efficiency in the low band. Switchable components 118 and/or 138 may be adjusted to tune the frequency response of antenna 40-1 in the low band.

In some scenarios, point 102 may be directly fed using a dedicated transmission line other than the transmission line coupled to antenna feed 50-1. However, use of a separate transmission line and the corresponding switching circuitry can undesirably attenuate the radio-frequency signals conveyed by the antenna. This attenuation may be eliminated by using the same radio-frequency transmission line to convey signals to both points 104 and 102 via positive antenna feed terminal 52-1. At the same time, point 102 is located relatively far from the transmission line for antenna 40-1. If care is not taken, the relatively long conductive path length from the transmission line to point 102 may introduce excessive inductance between the transmission line and point 102 when covering the low band. This inductance may undesirably limit the antenna efficiency for antenna 40-1 in the low band when switch 120 is open.

To minimize the inductance between point 102 and the transmission line coupled to positive antenna feed terminal 52-1, conductive trace 84-2 may have a relatively large width 82. In general, larger (wider) widths 82 may reduce the inductance between the transmission line and point 102 more than shorter (narrower) widths 82. At the same time, width 82 may be limited by the amount of space available between ground structures 78 and segment 70 (e.g., the width of slot 60). As examples, width 82 may be between 2.0 mm and 2.3 mm, between 2.5 mm and 2.9 mm, approximately 2.7 mm, between 1 mm and 4 mm, or any other desired width that balances a reduction in inductance with the amount of available space within slot 60. The length of conductive trace 84-2 (e.g., as measured perpendicular to width 82) may be approximately 20 mm, between 15 mm and 25 mm, between 10 mm and 20 mm, or any other desired length. The ratio of the length of conductive trace 84-2 to width 82 may be between 3 and 10, between 2 and 10, between 5 and 15, between 6 and 10, between 5 and 9, or any other desired ratio, as examples.

Conductive trace 84-2 may be located at a distance 88 from segment 70 and at a distance 86 from ground structures 78 (e.g., conductive trace 84-2 may be separated from ground structures 78 by a first portion of slot 60 and may be separated from segment 70 by a second portion of slot 60). Distance 88 may be shorter than distance 86 if desired. Distance 88 may be selected to allow conductive trace 84-2 to form a distributed capacitance with segment 70 such that when switch 120 is closed (e.g., when positive antenna feed terminal 52-2 is shorted to point 104), conductive trace 84-2 electrically forms a single integral conductor with segment 70. When switch 120 is open (e.g., when positive antenna feed terminal 52-2 feeds point 102 via conductive trace 84-2), conductive trace 84-2 electrically forms an inductor that is coupled in series between positive antenna feed terminal 52-2 and point 102 and that has an inductance that is lower than in scenarios where a conductive line or wire is used to connect positive antenna feed terminal 52-2 to point 102. As examples, distance 86 may be approximately 1.0 mm, between 0.8 mm and 1.2 mm, between 0.6 and 1.4 mm, or any other desired distance. Distance 88 may be approximately 0.5 mm, between 0.3 mm and 0.7 mm, between 0.2 mm and 0.8 mm, between 0.6 mm and 0.1 mm, or any other desired distance that is less than distance 86.

Conductive trace 84-2 may be formed on the dielectric material that is used to fill slot 60 (e.g., dielectric material that forms part of the exterior of device 10) or may be formed on a dielectric substrate mounted within slot 60 (e.g., a plastic block, flexible printed circuit, rigid printed circuit board, dielectric portions of other device components, etc.). Conductive trace 84-2 may be formed using other conductive structures such as stamped sheet metal, metal foil, integral portions of the housing for device 10, and/or any other desired conductive structures. The example of FIG. 6 is illustrative and non-limiting. If desired, conductive trace 84-2 may have other shapes (e.g., shapes following straight or meandering paths and having curved and/or straight edges).

When configured in this way, conductive trace 84-2 may form a relatively low-inductance feed line combiner (sometimes referred to as a feed combiner or trace combiner) that allows points 102 and 104 to share the same positive antenna feed terminal 52-1 and thus the same signal conductor of the same transmission line without sacrificing antenna efficiency even though points 102 and 104 are located relatively far apart. Conductive trace 84-2 may sometimes be referred to herein as feed combiner trace 84-2, low inductance trace 84-2, low inductance feed combiner trace 84-2, low inductance feed line combiner trace 84-2, fat trace 84-2, thick trace 84-2, wide trace 84-2, low inductance path 84-2, low inductance feed combiner structure 84-2, or feed line inductance limiting structure 84-2.

Similarly, in antenna 40-3, the length of segment 68 extending from point 94 to gap 18-3 and/or the length of segment 68 extending from point 94 to gap 18-1 may be selected to cover frequencies in the cellular low-midband, the cellular midband, the cellular high band, and/or the cellular ultra-high band (e.g., in a fundamental and/or harmonic mode(s)). Antenna 40-3 may cover these bands when switch 114 is closed to couple positive antenna feed terminal 52-3 to point 94, for example. If desired, switch 114 may decouple positive antenna feed terminal 52-3 from conductive trace 84-1 when coupling positive antenna feed terminal 52-3 to point 94.

To increase the effective length of the antenna resonating element arm in antenna 40-3 despite the fact that segment 68 is shorter than segment 70 in the example of FIG. 6, the length from positive antenna feed terminal 52-3 through conductive trace 84-1 to point 96 plus the length from point 96 to gap 18-1 may form the antenna resonating element arm for antenna 40-1 in the low band. This length may therefore be selected to cover frequencies in the low band. Switch 114 may be opened to decouple positive antenna feed terminal 52-3 from point 94 when covering the low band, for example. Switchable component 116 may be adjusted to tune the frequency response of antenna 40-3 in the cellular low band, if desired. When covering the low band, segment 68 may then be fed via conductive trace 84-1 at point 96. Point 96 may therefore sometimes be referred to herein as a positive antenna feed terminal when switch 114 is open. Opening switch 114 to couple positive antenna feed terminal 52-3 to point 96 may serve to shift electromagnetic hotspots in the cellular low band away from gap 18-3 and data connector 80 and towards gap 18-3. This may serve to minimize loading in the low band by data connector 80, as well as by external objects such as the user's body, thereby maximizing antenna efficiency in the low band.

To minimize the inductance between point 96 and the transmission line coupled to positive antenna feed terminal 52-3, conductive trace 84-1 may have a relatively large width 82, may be separated from ground structures 78 by a relatively large distance such as distance 86, and may be separated from segment 68 by a relatively small distance such as distance 88. Conductive trace 84-1 may be formed on the dielectric material that is used to fill slot 60 (e.g., dielectric material that forms part of the exterior of device 10) or may be formed on a dielectric substrate mounted within slot 60 (e.g., a plastic block, flexible printed circuit, rigid printed circuit board, dielectric portions of other device components, etc.). Conductive trace 84-1 may be formed using other conductive structures such as stamped sheet metal, metal foil, integral portions of the housing for device 10, and/or any other desired conductive structures. The example of FIG. 6 is illustrative and non-limiting. If desired, conductive trace 84-1 may have other shapes (e.g., shapes following straight or meandering paths and having curved and/or straight edges).

When configured in this way, conductive trace 84-1 may form a relatively low-inductance feed line combiner (sometimes referred to as a feed combiner or trace combiner) that allows points 94 and 96 to share the same positive antenna feed terminal 52-3 and thus the same signal conductor of the same transmission line without sacrificing antenna efficiency even though points 94 and 96 are located relatively far apart. Conductive trace 84-1 may sometimes be referred to herein as feed combiner trace 84-1, low inductance trace 84-1, low inductance feed combiner trace 84-1, low inductance feed line combiner trace 84-1, fat trace 84-1, thick trace 84-1, wide trace 84-1, low inductance path 84-1, low inductance feed combiner structure 84-1, or feed line inductance limiting structure 84-1.

The presence of data connector 80 at segment 70 may limit device 10 to using only one of antenna 40-1 or 40-3 to cover the low band at any given time. While switch 114 is shown only as coupling positive antenna feed terminal 52-3 and conductive trace 84-1 to point 94 in FIG. 6 for the sake of clarity, switch 114 may also have a state in which switch 114 forms a short circuit path from point 94 to ground structures 78 at frequencies in the low band. When antenna 40-1 is actively covering the low band (e.g., while switch 120 is open or otherwise coupling positive antenna feed terminal 52-1 to point 102 via conductive trace 84-2), switchable component 116 and/or switch 114 in antenna 40-3 and may be controlled to form short circuit paths to ground at frequencies in the low band, as shown by arrows 140. This may effectively kill any low band resonance of antenna 40-3 while antenna 40-1 is covering the low band, minimizing interference between the antennas and the impact of data connector 80 on low band communications. Antenna 40-3 and positive antenna feed terminal 52-3 may still cover other frequency bands while antenna 40-1 covers the low band (e.g., switch 114 may still couple positive antenna feed terminal 52-3 to point 94 at frequencies greater than the low band while also forming a short circuit impedance from point 94 to ground structures 78 at frequencies in the low band).

Conversely, when antenna 40-3 is actively covering the low band (e.g., while switch 114 is open or otherwise coupling positive antenna feed terminal 52-3 to point 96 via conductive trace 84-1), switchable component 118 and/or switchable component 138 of antenna 40-1 may form short circuit impedances between segment 70 and ground structures 78 at frequencies in the low band, as shown by arrows 142. This may effectively kill any low band resonance of antenna 40-1 while antenna 40-3 is covering the low band, minimizing interference between the antennas and the impact of data connector 80 on low band communications. Control circuitry 38 (FIG. 1) may provide control signals that control the state of the switchable components and switches of FIG. 6. In this way, antennas 40-1 and 40-3 may both cover the cellular low band with satisfactory antenna efficiency (e.g., efficiency bandwidth) while also covering higher frequencies, despite the relatively small volume of antenna 40-3 relative to antenna 40-1 and despite the presence of a relatively large data connector 80. This may, for example, increase the amount of low band diversity achievable with device 10 (e.g., allowing antenna 40-3 to cover the low band when a user's hand or other object is blocking antenna 40-1 and allowing antenna 40-1 to cover the low band when a user's hand or other object is blocking antenna 40-3).

Control circuitry 38 (FIG. 2) may select the antenna from antennas 40-1 and 40-3 that exhibits the best performance in the cellular LB to convey radio-frequency signals in the cellular LB at any given time. This can be particularly challenging because antennas 40-1 and 40-3 are located in the lower end of device 10 and are therefore susceptible to detuning in the cellular low band when device 10 is held by a user (e.g., when device 10 is gripped by the user's hand). The user may also change their grip or how they are holding device 10 over time, which can dynamically alter the impedance loading of antennas 40-1 and 40-3 in the cellular LB.

Figure 7:
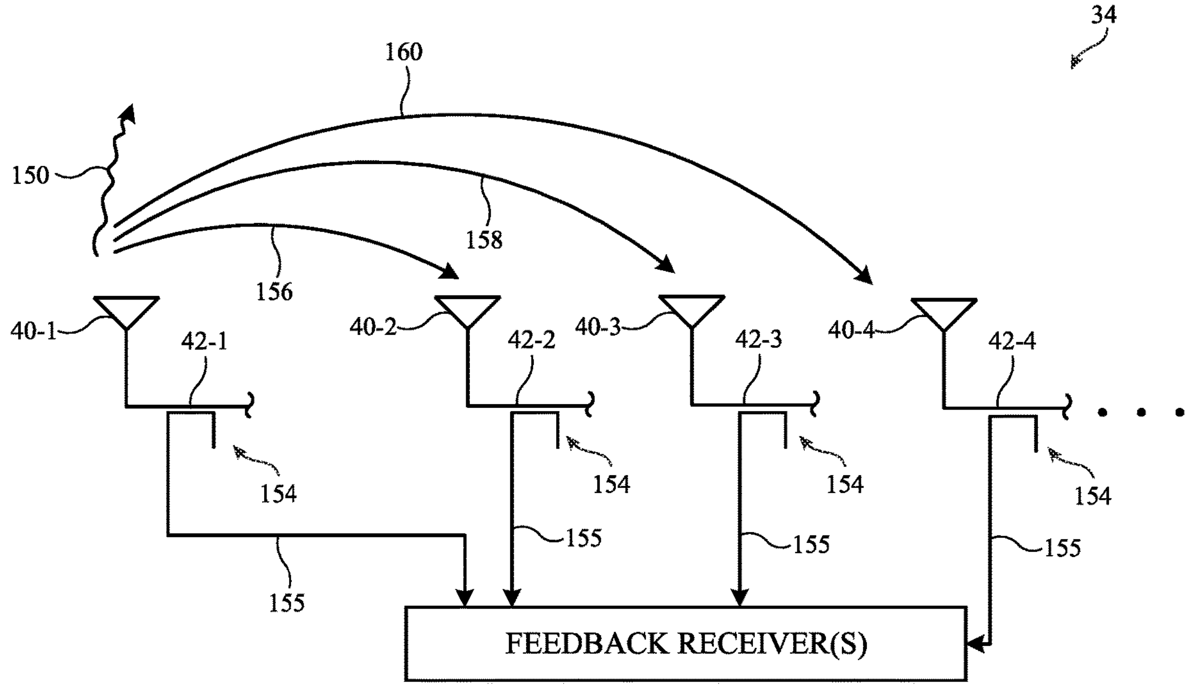
FIG. 7 is a diagram showing how radio-frequency signals transmitted by a first antenna may be coupled onto other antennas in accordance with some embodiments.

If desired, control circuitry 38 may use information associated with radio-frequency coupling between antennas 40-1 and 40-3 to select which of the antennas will be used to convey radio-frequency signals in the cellular LB. FIG. 7 is a diagram showing how radio-frequency coupling may arise between different antennas in device 10. As shown in FIG. 7, wireless circuitry 34 may include a set of antennas 40 such as antennas 40-1, 40-2, 40-3, and 40-4. Each antenna may be fed by a corresponding transmission line path 42 (e.g., antenna 40-1 may be fed by transmission line path 42-1, antenna 40-3 may be fed by transmission line path 42-3, etc.).

Each transmission line path 42 may have a radio-frequency signal coupler 154 interposed thereon. Each signal coupler 154 may have one or more nodes/terminals (e.g., a forward wave or coupled node/terminal, a reverse wave or isolated node/terminal, etc.) that are coupled to one or more feedback receivers 152 over one or more feedback paths 155. Each antenna may be coupled to a different respective feedback receiver over a different respective feedback path or two or more (e.g., all) of the antennas may share the same feedback receiver and/or some or all of the same feedback path.

Antenna 40-1 may transmit radio-frequency signals 150. During transmission, some of radio-frequency signals 150 may be electromagnetically coupled onto antenna 40-2 (e.g., via mutual coupling), as shown by arrow 156, onto antenna 40-3, as shown by arrow 158, onto antenna 40-4, as shown by arrow 160, etc. These coupled/received signals may be carried down the corresponding transmission line paths 42. Signal couplers 154 may couple some of the transmitted and/or received (coupled) radio-frequency signals conveyed over transmission line paths 42 off of the transmission line paths and may direct the signals to feedback receiver(s) 152 over feedback path(s) 155.

Feedback receiver(s) 152 may receive the portions of the radio-frequency signals coupled off of the transmission line paths by signal coupler(s) 154 to measure radio-frequency waves that are transmitted along transmission line paths 42. The radio-frequency waves may include forward waves (e.g., travelling along a transmission line path 42 from the transceiver to the antenna) and/or reverse waves (e.g., travelling along transmission line path 42 from the antenna to the transceiver). Control circuitry 38 (FIG. 2) may use the measurements of forward waves and reverse waves for one or more antennas 40 to characterize the impedance of the antenna(s) (e.g., to measure the impedance or to perform impedance measurements).

In general, impedance discontinuities between transmission line paths 42 and antennas 40 can produce reflection of the radio-frequency signals at the boundary between transmission line paths 42 and antennas 40. The reflected and incident waves at the ports of each signal coupler 154 may be characterized by complex scattering parameters sometimes referred to as S-parameters. The S-parameters include S11 (e.g., a reflection coefficient at the input port) and S21 (e.g., a forward coefficient characterizing forward voltage gain, sometimes referred to as a transmission coefficient). Feedback receiver(s) 152 and/or control circuitry 38 may generate S-parameter values from signals coupled off of transmission line paths 42 using signal couplers 154.

Reflection coefficient values (e.g., S11 values) may characterize the strength of the impedance discontinuity at antennas 40 (e.g., higher discontinuities may produce more signal reflection). Control circuitry 38 (FIG. 2) may adjust the tuning of an antenna 40 (e.g., an aperture tuner and/or impedance matching circuitry for the antenna) based on the reflection coefficient values to minimize the impedance discontinuity and optimize antenna performance. In practice, the presence of external objects such as a user's hand gripping the lower end of device 10 may change the impedance loading of the antenna from a free space impedance. Adjusting the tuning may help to compensate for such a change in impedance loading (e.g., to minimize the impedance discontinuity) to prevent detuning of the antenna and to maximize antenna efficiency. However, adjusting the tuning of an antenna 40 may not be sufficient to optimize performance in the cellular LB for antenna 40-1 or antenna 40-3. In these situations, control circuitry 38 may change which of antenna 40-1 or antenna 40-3 is used to convey radio-frequency signals in the cellular LB.

Control circuitry 38 may determine when to switch between using antenna 40-1 or antenna 40-3 based on transmission coefficient values (e.g., S21 values) generated using signal couplers 154. For example, the control circuitry may use the signal couplers 154 for antennas 40-1 and 40-3 to measure the amount of energy transmitted over antenna 40-1 in the cellular LB (e.g., during transmission of radio-frequency signals 150) and the amount of transmitted energy that has coupled onto antenna 40-3. When a user changes their grip, the strength of electromagnetic mutual coupling between antenna 40-1 and antenna 40-3 changes, which results in a change in the measured transmission coefficient value (e.g., S21) for antenna 40-1 onto antenna 40-3. The control circuitry may therefore monitor the forward coefficient value to determine when to switch between antennas for covering the cellular LB. When the forward coefficient value falls into a predetermined range, this may be indicative of antenna 40-3 exhibiting superior performance in the cellular LB and the control circuitry may then use antenna 40-3 to convey radio-frequency signals in the cellular low band. This process may continue to determine when to switch back to using antenna 40-1 to cover the cellular LB and/or to determine when to switch any other antenna in device 10 into use for covering any desired bands.

Figure 8:
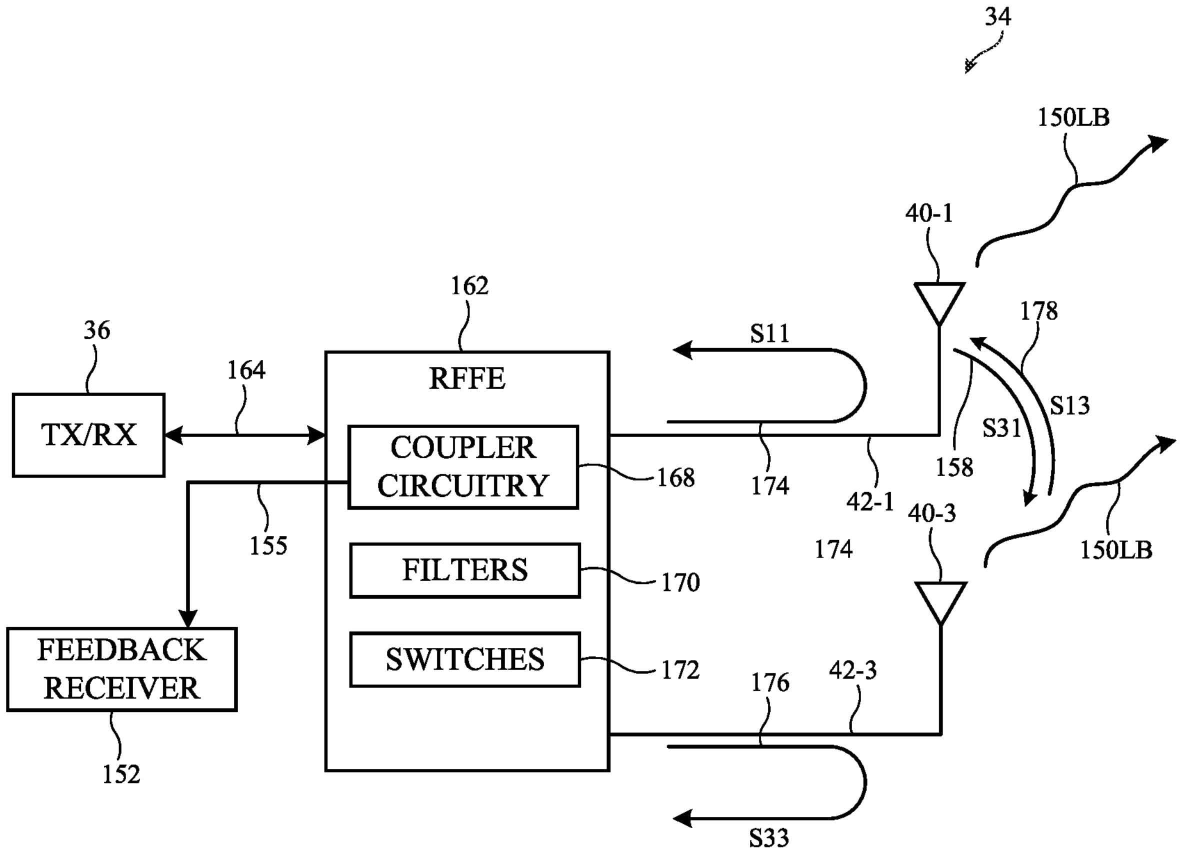
FIG. 8 is a diagram of illustrative wireless circuitry having radio-frequency front end circuitry that is used to measure complex scattering parameters for a first antenna and a second antenna in accordance with some embodiments.

FIG. 8 is a diagram showing how wireless circuitry 34 may monitor complex S-parameters for antennas 40-1 and 40-3 to determine when to switch between antennas 40-1 and 40-3 for covering the cellular LB. As shown in FIG. 8, wireless circuitry 34 may include radio-frequency front end (RFFE) circuitry 162 (sometimes referred to herein simply as RFFE 162) coupled between transceiver 36 and antennas 40-1 and 40-3. The components of RFFE 162 may be mounted to a single substrate such as a printed circuit board or package (e.g., as an integrated RFFE module) or may be distributed across several substrates.

Transmission line path 42-1 may couple RFFE 162 to antenna 40-1. Transmission line path 42-3 may couple RFFE 162 to antenna 40-3. RFFE 162 may also be coupled to radio-frequency transceiver circuitry 36 (e.g., one or more transceivers) over radio-frequency path(s) 164. Radio-frequency path(s) 164 may, for example, include transmission line paths 42-1 and 42-3, where RFFE 162 is disposed or interposed on both transmission line paths 42-1 and 42-3.

RFFE 162 may include radio-frequency signal coupler circuitry 168 (sometimes referred to herein simply as coupler circuitry 168). Coupler circuitry 168 may include one or more signal couplers 154 (FIG. 7), switching circuitry, and/or filter circuitry, for example. RFFE 162 may also include radio-frequency filters such as filters 170 (e.g., filters that are separate from coupler circuitry 168). Filters 170 may separate signals on different radio-frequency paths by frequency band. RFFE 162 may also include switching circuitry such as switches 172. Switches 172 may be used to selectively control antenna 40-1 and/or antenna 40-3 to transmit or receive radio-frequency signals in different frequency bands.

During operation, antenna 40-1 may be used to transmit radio-frequency signals 150 such as LB signals 150LB. Transceiver circuitry 36 may generate LB signals 150LB (e.g., based on baseband signals provided by baseband circuitry in wireless circuitry 34). Transceiver circuitry 36 may transmit LB signals 150LB to RFFE 162 over radio-frequency path(s) 164. Switches 172 and filters 170 may pass LB signals 150LB onto transmission line path 42-1. Coupler circuitry 168 may be used to measure the forward wave of LB signals 150LB as the LB signals are transmitted over transmission line path 42-1. For example, some of the forward wave may be coupled off of transmission line path 42-1 by coupler circuitry 168 and passed to feedback receiver 152 over feedback path 155. Feedback receiver 152 may measure the magnitude and/or phase of the forward wave (sometimes referred to herein as forward wave or transmitted signal measurements).

Antenna 40-1 may transmit LB signals 150LB over-the-air. Some of LB signals 150LB will be coupled onto antenna 40-3, as shown by arrow 158. Some of LB signals 150LB will also reflect off of antenna 40-1 and back towards RFFE 162, as shown by arrow 174 (e.g., due to an impedance discontinuity in the LB between transmission line path 42-1 and antenna 40-1, which may sometimes be produced at least in part by the presence of a hand or other object over antenna 40-1). Coupler circuitry 168 may be used to measure the reflected LB signals (sometimes referred to as the reverse wave of LB signals 150LB). For example, some of the reverse wave may be coupled off of transmission line path 42-1 by coupler circuitry 168 and passed to feedback receiver 152 over feedback path 155. Feedback receiver 152 may measure the magnitude and/or phase of the reverse wave (sometimes referred to herein as reverse wave or reflected signal measurements).

Feedback receiver 152 may generate complex reflection coefficient values (S11 scattering parameter values) for antenna 40-1 based on the forward and reverse wave measurements. A high amount of reverse wave signal relative to forward wave signal may, for example, be indicative of a relatively high amount of signal reflection at antenna 40-1 and thus a relatively large impedance discontinuity at antenna 40-1. If desired, the control circuitry may adjust the tuning of antenna 40-1 based on the S11 values to help to reduce the impedance discontinuity (e.g., to help compensate for detuning of antenna 40-1 from loading by an external object such as a user's hand).

Antenna 40-1 (and the tuning circuitry for antenna 40-1, which may include an aperture tuner or impedance matching circuitry) may, for example, have a free space tuning state (mode) and a grip tuning state (mode). The free space tuning state may be optimized to situations where antenna 40-1 is not loaded by external objects (e.g., may maximize the antenna efficiency of antenna 40-1 when the antenna is not being touched or gripped by a user). The grip tuning state may be optimized to situations where antenna 40-1 is loaded by an external object (e.g., may maximize the antenna efficiency of antenna 40-1 when the antenna is being touched or gripped by a user). Antenna 40-3 (and the tuning circuitry for antenna 40-3, which may include an aperture tuner or impedance matching circuitry) may also have a free space tuning state and a grip tuning state.

Antenna 40-1 may couple a portion of the transmitted LB signals 150LB onto antenna 40-3 (e.g., as shown by arrow 158), which passes the portion onto transmission line path 42-3. Coupler circuitry 168 may be used to measure the LB signals 150LB coupled onto antenna 40-3 and conveyed over transmission line path 42-3. For example, some of the coupled LB signal may be coupled off of transmission line path 42-3 by coupler circuitry 168 and passed to feedback receiver 152 over feedback path 155. Feedback receiver 152 may measure the magnitude and/or phase of the coupled signal (sometimes referred to herein as coupled signal or received signal measurements).

Feedback receiver 152 may generate complex transmission coefficient values (S21 scattering parameter values) for antenna 40-1 onto antenna 40-3 based on the forward wave measurements from transmission line path 42-1 and the coupled signal measurements from transmission line path 42-3. The complex transmission coefficient values (S21 values) from antenna 40-1 onto antenna 40-3 are referred to herein as S31 values (since antenna 40-3 is sometimes referred to herein as ANT3 whereas antenna 40-1 is sometimes referred to herein as ANT1). The S31 values may, for example, characterize the amount of radio-frequency energy from LB signals 150LB coupled onto antenna 40-3 by antenna 40-1 (e.g., as shown by arrow 158). The presence of external objects at or adjacent antennas 40-1 and/or 40-3 may change the amount of LB signals coupled onto antenna 40-3. As such, the S31 values may be used to monitor the impedance loading of the antennas in real time.

Feedback receiver 152 and the control circuitry may monitor the S31 values to determine when to switch to antenna 40-3 for conveying LB signals 150LB. For example, when the measured S31 values fall into a predetermined range of S31 values (e.g., falling below or exceeding a threshold value, which may be indicative of a user's hand covering antenna 40-1 but not antenna 40-3 or is otherwise indicative of antenna 40-3 exhibiting superior LB performance than antenna 40-1), the control circuitry may switch antenna 40-3 into use for covering the LB.

Antenna 40-3 may then be used to transmit LB signals 150LB. Transceiver circuitry 36 may generate LB signals 150LB (e.g., based on baseband signals provided by baseband circuitry in wireless circuitry 34). Transceiver circuitry 36 may transmit LB signals 150LB to RFFE 162 over radio-frequency path(s) 164. Switches 172 and filters 170 may pass LB signals 150LB onto transmission line path 42-3. Coupler circuitry 168 may be used to measure the forward wave of LB signals 150LB as the LB signals are transmitted over transmission line path 42-3. For example, some of the forward wave may be coupled off of transmission line path 42-3 by coupler circuitry 168 and passed to feedback receiver 152 over feedback path 155. Feedback receiver 152 may measure the magnitude and/or phase of the forward wave (sometimes referred to herein as forward wave or transmitted signal measurements).

Antenna 40-3 may transmit LB signals 150LB over-the-air. Some of LB signals 150LB will be coupled onto antenna 40-1, as shown by arrow 178. Some of LB signals 150LB will also reflect off of antenna 40-3 and back towards RFFE 162, as shown by arrow 176 (e.g., due to an impedance discontinuity in the LB between transmission line path 42-3 and antenna 40-3, which may sometimes be produced at least in part by the presence of a hand or other object over antenna 40-3). Coupler circuitry 168 may be used to measure the reflected LB signals (e.g., the reverse wave of LB signals 150LB). For example, some of the reverse wave may be coupled off of transmission line path 42-3 by coupler circuitry 168 and passed to feedback receiver 152 over feedback path 155. Feedback receiver 152 may measure the magnitude and/or phase of the reverse wave (sometimes referred to herein as reverse wave or reflected signal measurements).

Feedback receiver 152 may generate complex reflection coefficient values (S11 scattering parameter values) for antenna 40-3 based on the forward and reverse wave measurements. The S11 values for antenna 40-3 are labeled herein as S33 values to help distinguish them from the complex reflection coefficient values gathered for antenna 40-1, which are referred to herein simply as S11 values. If desired, the control circuitry may adjust the tuning of antenna 40-3 based on the S33 values to help to reduce the impedance discontinuity (e.g., to help compensate for detuning of antenna 40-1 from loading by an external object such as a user's hand). For example, the control circuitry may adjust antenna 40-3 between free space and grip tuning states.

Antenna 40-3 may couple a portion of the transmitted LB signals 150LB onto antenna 40-1 (e.g., as shown by arrow 178), which passes the portion onto transmission line path 42-1. Coupler circuitry 168 may be used to measure the LB signals 150LB coupled onto antenna 40-1 and conveyed over transmission line path 42-1. For example, some of the coupled LB signal may be coupled off of transmission line path 42-1 by coupler circuitry 168 and passed to feedback receiver 152 over feedback path 155. Feedback receiver 152 may measure the magnitude and/or phase of the coupled signal (sometimes referred to herein as coupled signal or received signal measurements).

Feedback receiver 152 may generate complex transmission coefficient values (S21 scattering parameter values) for antenna 40-3 onto antenna 40-1 based on the forward wave measurements from transmission line path 42-3 and the coupled signal measurements from transmission line path 42-1. The complex transmission coefficient values (S21 values) from antenna 40-3 onto antenna 40-1 are referred to herein as S13 values (to help distinguish from the complex transmission coefficient values S31 characterizing coupling from antenna 40-1 onto antenna 40-3 during transmission by antenna 40-1).

Feedback receiver 152 and the control circuitry may monitor the S13 values to determine when to switch back to antenna 40-1 for conveying LB signals 150LB. For example, when the measured S13 values fall into a predetermined range of S13 values (e.g., falling below or exceeding a threshold value, which may be indicative of a user's hand covering antenna 40-3 but not antenna 40-1 or is otherwise indicative of antenna 40-1 exhibiting superior LB performance than antenna 40-3), the control circuitry may switch antenna 40-1 into use for covering the LB. Antenna 40-1 may then be used to transmit LB signals 150LB. This process may repeat over time to ensure that each antenna remains tuned to the best extend possible and to switch the best performing antenna for the LB into use over time, even as the loading conditions for the antennas change such as when a user changes their grip on device 10.

Figure 9:
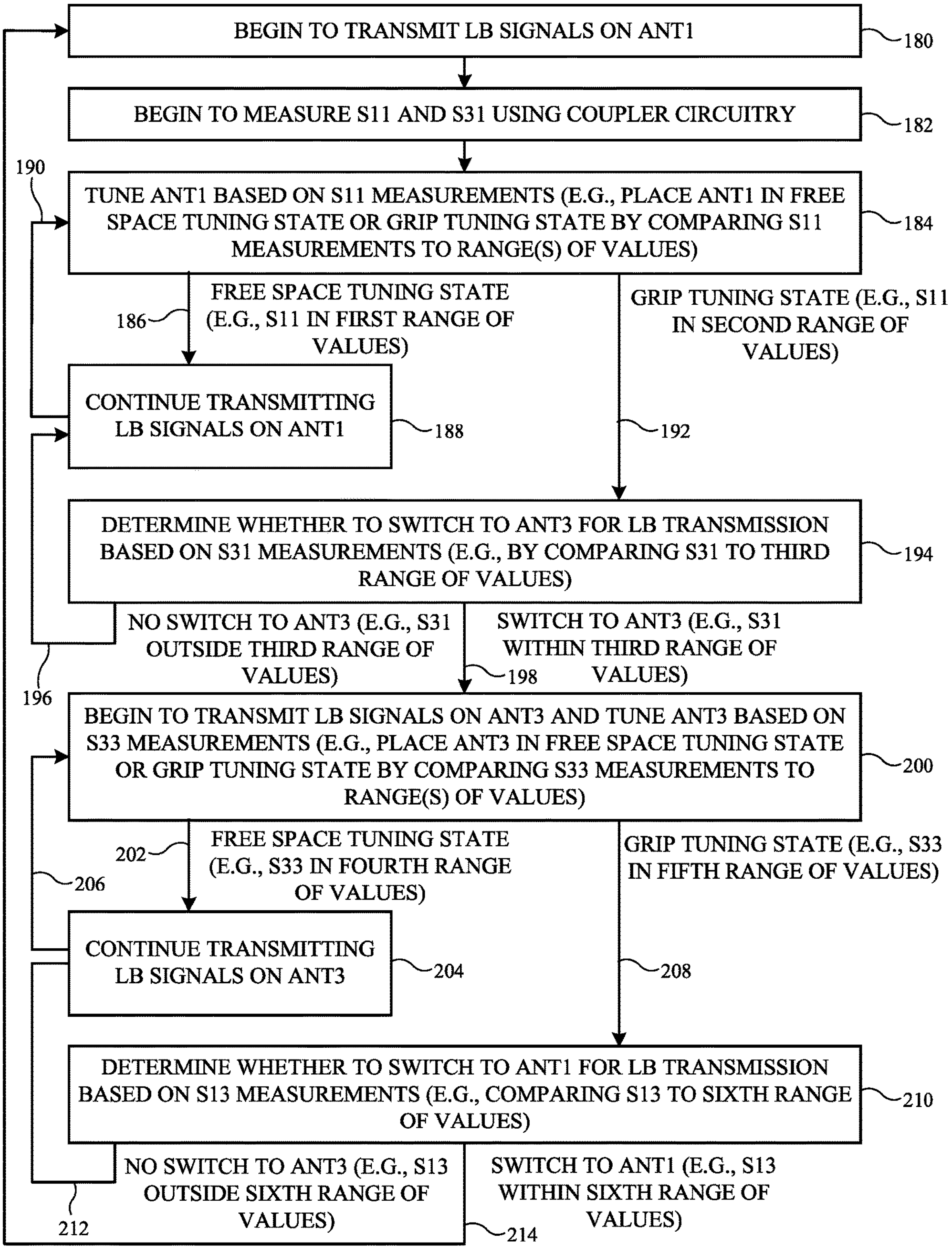
FIG. 9 is a flow chart of illustrative operations involved in tuning and switching between first and second antennas based on complex scattering parameters measured using the first and second antennas in accordance with some embodiments.

The example of FIG. 8 is illustrative and non-limiting. In general, RFFE 162 may be used to couple signals off of any desired antennas in device 10 (e.g., for switching between any desired antennas 40). The transmitted and coupled signals may be in any desired frequency band. FIG. 9 is a flow chart of illustrative operations that may be performed by device 10 to tune and switch between antennas 40-1 and 40-3 for covering the LB based on complex scattering parameters gathered using RFFE 162.

At operation 180, antenna 40-1 (ANT1) may begin to transmit low band signals 150LB. Some of low band signals 150LB may be coupled onto antenna 40-3 and transmission line path 42-3 (e.g., as shown by arrow 158 of FIG. 8). If desired, switchable component 116 and/or switch 114 in antenna 40-3 (ANT3) and may be controlled to form short circuit paths to ground at frequencies in the low band, as shown by arrows 140 of FIG. 6. This may effectively kill any low band resonance of antenna 40-3 while antenna 40-1 is covering the low band, thereby optimizing the LB performance of antenna 40-1.

At operation 182, coupler circuitry 168 and feedback receiver 152 may begin to generate (e.g., gather, perform, measure, sense, etc.) S11 values associated with the reflection of low band signals 150LB at antenna 40-1 (e.g., as shown by arrow 174 of FIG. 8). Coupler 168 and feedback receiver 152 may also begin to generate S31 values associated with the coupling of low band signals 150LB onto antenna 40-3 (e.g., as shown by arrow 158 of FIG. 8). Coupler 168 and feedback receiver 152 may measure S11 values and S31 values at the same time or at different times (e.g., in a time-interleaved or duplexed manner). Measurements of S11 and S31 may be separated by more than 100 ms if desired.

At operation 184, control circuitry 38 (FIG. 2) may tune or adjust the tuning of antenna 40-1 based on the generated S11 values (sometimes referred to herein as S11 measurements). This may include adjusting impedance matching circuitry coupled to antenna feed 50-1 (FIG. 6) and/or adjusting aperture tuning circuitry coupled across slot 60 (e.g., coupled between terminals 134 and 100 of FIG. 6, coupled between terminals 136 and 130, or elsewhere on antenna 40-1). This tuning may help to minimize the impedance discontinuity between antenna 40-1 and transmission line path 42-1 to reduce signal reflections and mitigate potential detuning by external objects. Antenna 40-1 may, for example, be placed into the free space tuning state or the grip tuning state.

Antenna 40-1 may be placed in the free space tuning state when the S11 values fall within a first range of values (e.g., exhibit a magnitude that is less than a corresponding threshold value). When antenna 40-1 is placed in the free space tuning state (e.g., when there is relatively little signal reflection, a relatively small impedance discontinuity at antenna 40-1, or no external object at or adjacent to antenna 40-1), processing may proceed to operation 188 via path 186.

At operation 188, antenna 40-1 may continue to transmit LB signals 150LB while in the free space tuning state. Processing may loop back to operation 184 via path 190 to adjust the tuning of antenna 40-1 as needed over time.

Antenna 40-1 may be placed in the grip space tuning state when the S11 values fall within a second range of values (e.g., exhibit a magnitude that exceeds a corresponding threshold value). When antenna 40-1 is placed in the grip tuning state (e.g., when there is a relatively high amount of signal reflection, a relatively large impedance discontinuity at antenna 40-1, or an external object at or adjacent to antenna 40-1), processing may proceed from operation 184 to operation 194 via path 192.

At operation 194, the control circuitry may determine whether to switch to antenna 40-3 for covering the LB based on the generated S31 values (sometimes referred to herein as S31 measurements) (e.g., by comparing the S31 values to a third range of values). The control circuitry may, for example, switch to antenna 40-3 when the S31 values fall within the third range of values (e.g., below an upper threshold defining the third range of values and/or above a lower threshold defining the third range of values). When the S31 values do not fall inside the third range of values (e.g., fall outside the third range of values, above the upper threshold, below the lower threshold, etc.), processing may loop back to operation 188 via path 196 and antenna 40-1 may continue to transmit LB signals 150LB while in the grip tuning state.

When the S31 values fall inside the third range of values, processing may proceed to operation 200 via path 198. At operation 200, the control circuitry may adjust switches 172 (FIG. 8) to switch antenna 40-3 into use for LB transmission while switching antenna 40-1 out of use for LB transmission. Antenna 40-3 (ANT3) may then begin to transmit low band signals 150LB. Some of low band signals 150LB may be coupled onto antenna 40-1 and transmission line path 42-1 (e.g., as shown by arrow 178 of FIG. 8). If desired, switchable component 118 and/or switchable component 138 of antenna 40-1 may form short circuit impedances between segment 70 and ground structures 78 at frequencies in the low band, as shown by arrows 142 of FIG. 6. This may effectively kill any low band resonance of antenna 40-1 while antenna 40-3 is covering the low band, thereby optimizing the LB performance of antenna 40-3.

Coupler circuitry 168 and feedback receiver 152 may also begin to generate (e.g., gather, perform, measure, sense, etc.) S33 values associated with the reflection of low band signals 150LB at antenna 40-3 (e.g., as shown by arrow 176 of FIG. 8). Coupler circuitry 168 and feedback receiver 152 may also begin to generate S13 values associated with the coupling of low band signals 150LB onto antenna 40-1 (e.g., as shown by arrow 178 of FIG. 8).

The control circuitry may also tune or adjust the tuning of antenna 40-3 based on the generated S33 values (sometimes referred to herein as S33 measurements). This may include adjusting impedance matching circuitry coupled to antenna feed 50-3 (FIG. 6) and/or adjusting aperture tuning circuitry coupled across slot 60 (e.g., coupled between terminals 132 and 98 of FIG. 6 or elsewhere on antenna 40-3). This tuning may help to minimize the impedance discontinuity between antenna 40-3 and transmission line path 42-3 to reduce signal reflections and mitigate potential detuning by external objects. Antenna 40-3 may, for example, be placed into the free space tuning state or the grip tuning state.

Antenna 40-3 may be placed in the free space tuning state when the S33 values fall within a fourth range of values (e.g., exhibit a magnitude that is less than a corresponding threshold value). When antenna 40-3 is placed in the free space tuning state (e.g., when there is relatively little signal reflection, a relatively small impedance discontinuity at antenna 40-3, or no external object at or adjacent to antenna 40-3), processing may proceed to operation 204 via path 202.

At operation 204, antenna 40-3 may continue to transmit LB signals 150LB while in the free space tuning state. Processing may loop back to operation 200 via path 206 to adjust the tuning of antenna 40-3 as needed over time.

Antenna 40-3 may be placed in the grip space tuning state when the S33 values fall within a fifth range of values (e.g., exhibit a magnitude that exceeds a corresponding threshold value). When antenna 40-3 is placed in the grip tuning state (e.g., when there is a relatively high amount of signal reflection, a relatively large impedance discontinuity at antenna 40-3, or an external object at or adjacent to antenna 40-3), processing may proceed from operation 200 to operation 210 via path 208.

At operation 210, the control circuitry may determine whether to switch back to antenna 40-1 for covering the LB based on the generated S13 values (sometimes referred to herein as S13 measurements) (e.g., by comparing the S13 values to a sixth range of values). The control circuitry may, for example, switch to antenna 40-1 when the S13 values fall within the sixth range of values (e.g., below an upper threshold defining the sixth range of values and/or above a lower threshold defining the sixth range of values). When the S13 values do not fall inside the sixth range of values (e.g., fall outside the sixth range of values, above the upper threshold, below the lower threshold, etc.), processing may loop back to operation 204 via path 212 and antenna 40-3 may continue to transmit LB signals 150LB while in the grip tuning state.

When the S13 values fall inside the sixth range of values, the control circuitry may adjust switches 172 (FIG. 8) to switch antenna 40-1 into use for LB transmission while switching antenna 40-3 out of use for LB transmission. Processing may then loop back to operation 180 via path 214 and antenna 40-1 may begin to transmit low band signals 150LB again.

The example of FIG. 9 is illustrative and non-limiting and, if desired, other operations may be performed to switch between and/or tune the antennas. If desired, when the S31 values fall into the third range of values prior to or during operation 184, processing may jump to operation 200 without attempting to tune the antenna between grip or free space tuning states (e.g., antenna 40-1 need not already be in the grip tuning state for antenna 40-3 to be switched into use for covering the LB). Similarly, if desired, when the S13 values fall into the sixth range of values during operation 200, processing may jump to operation 180 without attempting to tune the antenna between grip or free space tuning states (e.g., antenna 40-3 need not already be in the grip tuning state for antenna 40-1 to be switched into use for covering the LB).

Figure 10:
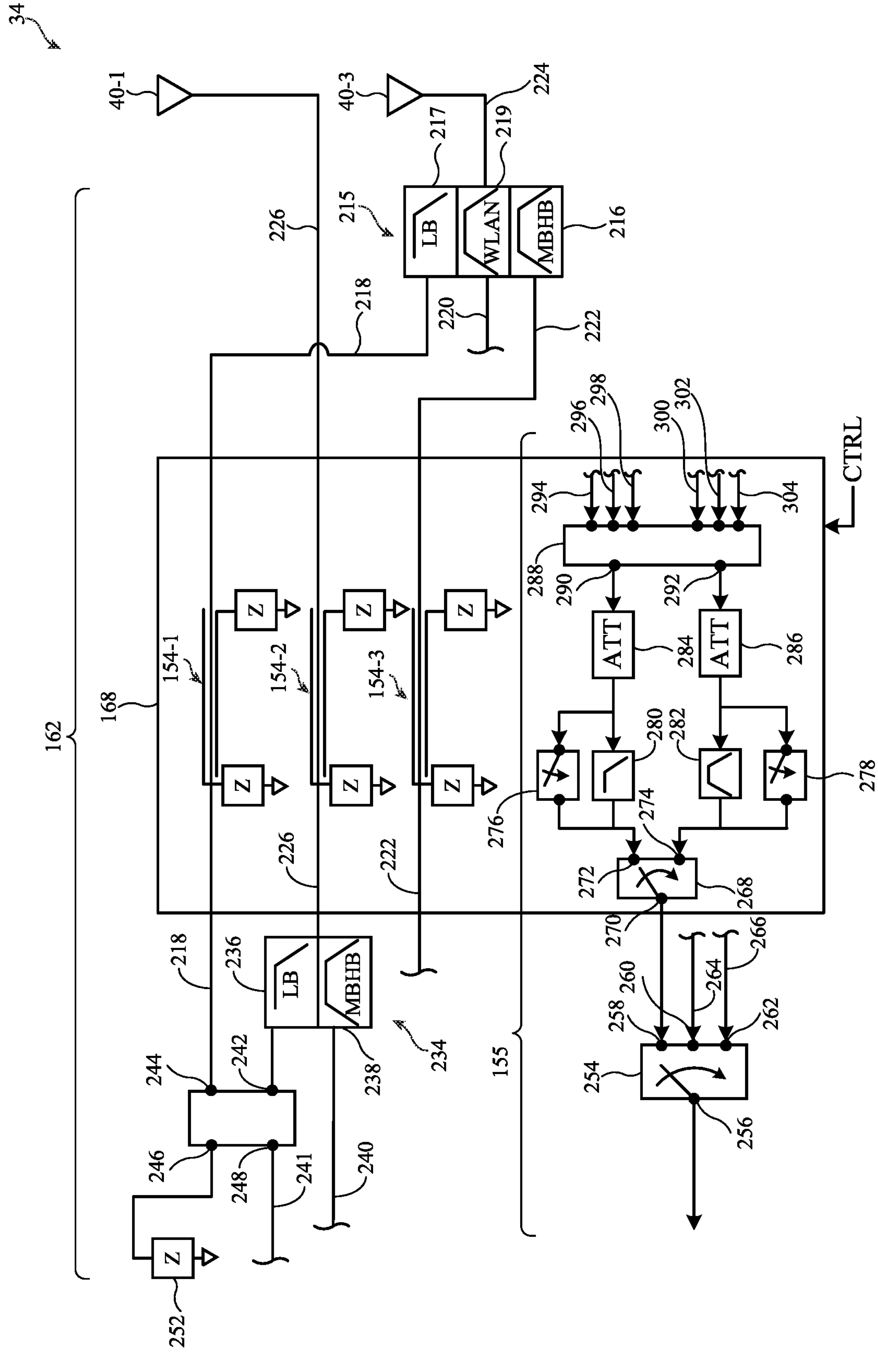
FIG. 10 is a circuit diagram of illustrative radio-frequency front end circuitry that measures complex scattering parameters for a first antenna and a second antenna in accordance with some embodiments.

FIG. 10 is a circuit diagram showing one example of illustrative circuit components that may be used to implement RFFE 162 of FIG. 8. As shown in FIG. 10, RFFE 162 may include switching circuitry such as radio-frequency switches 250 and 254. Switches 250 and 254 may, for example, form switches 172 of FIG. 8. RFFE 162 may also include radio-frequency filter circuitry such as filters 234 and 215. Filters 234 and 215 may, for example, form filters 170 of FIG. 8.

Radio-frequency path 226 may be coupled to the antenna feed for antenna 40-1. Radio-frequency path 224 may couple the antenna feed for antenna 40-3 to a first terminal (port) of filter 215. Filter 215 may be, for example, a triplexer having a low pass filter (LPF) 217, a first band pass filter (BPF) 219, and a second BPF 216. LPF 217 may couple radio-frequency path 224 to radio-frequency path 218 (e.g., at a second terminal (port) of filter 215). Radio-frequency paths 218 and 224 may sometimes also be referred to herein as a single radio-frequency path having LPF 217 disposed thereon. BPF 219 may couple radio-frequency path 224 to radio-frequency path 220 (e.g., at a third terminal (port) of filter 215). BPF 216 may couple radio-frequency path 224 to radio-frequency path 222 (e.g., at a fourth terminal (port) of filter 215). Radio-frequency paths 224, 218, 220, and 222 may, for example, form part of transmission line path 42-3 of FIG. 8.

Radio-frequency path 226 may couple antenna 40-1 to a first terminal (port) of filter 234. Filter 234 may be, for example, a duplexer or diplexer having a low pass filter (LPF) 236 and a BPF 238. Switch 250 may have a first terminal (port) 242, a second terminal (port) 244, a third terminal (port) 246, and a fourth terminal (port) 248. Switch 250 may be, for example, a double-pole double-throw (DPDT) for coupling terminal 244 to terminals 246 or 248 and terminal 242 to terminals 246 or 248. LPF 236 may couple radio-frequency path 226 to terminal 242 of switch 250. BPF 238 may couple radio-frequency path 226 to radio-frequency path 240. Radio-frequency path 226 may couple BPF 238 and thus antenna 40-1 to transceiver circuitry 36 of FIG. 8 (e.g., a cellular transceiver in transceiver circuitry 36).

Radio-frequency path 218 may couple LPF 217 and thus antenna 40-3 to terminal 244 of switch 250. Terminal 246 of switch 250 may be coupled to a termination load such as load 252. Terminal 248 of switch 250 may be coupled to transceiver circuitry 36 of FIG. 8 (e.g., the cellular transceiver in transceiver circuitry 36) over radio-frequency path 241. Radio-frequency paths 226, 240, and 241 may, for example, form part of transmission line path 42-1 of FIG. 8.

Radio-frequency path 220 may couple BPF 219 and thus antenna 40-3 to transceiver circuitry 36 of FIG. 8 (e.g., a WLAN/WPAN transceiver in transceiver circuitry 36). Radio-frequency path 222 may couple BPF 216 to transceiver circuitry 36 of FIG. 8 (e.g., the cellular transceiver in transceiver circuitry 36). LPF 217 in filter 215 may be configured to pass radio-frequency signals in the LB between radio-frequency paths 218 and 224 while blocking signals at higher frequencies (e.g., LPF 217 may have a cutoff frequency above the LB). BPF 219 in filter 215 may have a passband that passes radio-frequency signals in the WLAN/WPAN band between radio-frequency paths 220 and 224 while blocking signals at other frequencies. BPF 216 in filter 215 may have a passband that passes radio-frequency signals in the cellular MB and the cellular HB while blocking signals at other frequencies.

Filter 215 may therefore serve to combine LB signals transmitted over radio-frequency path 218 with WLAN/WPAN signals transmitted over radio-frequency path 220 and/or MB/HB signals transmitted over radio-frequency path 222 onto radio-frequency path 224 for transmission by antenna 40-3. Conversely, filter 215 may divide radio-frequency signals received by antenna 40-3 and radio-frequency path 224 between radio-frequency paths 218, 220, and 222 based on the frequency band of the received signals. In this way, filter 215 may allow antenna 40-3 to handle multiple different frequency bands with minimal interference.

LPF 236 in filter 234 may be configured to pass radio-frequency signals in the LB between switch 250 and radio-frequency path 226 while blocking signals at higher frequencies (e.g., LPF 236 may have a cutoff frequency above the LB, which may be the same as the cutoff frequency of LPF 217). BPF 238 in filter 234 may have a passband that passes radio-frequency signals in the MB and HB between radio-frequency paths 240 and 226 while blocking signals at other frequencies. Filter 234 may therefore serve to combine LB signals transmitted over radio-frequency path 241 with MB/HB signals transmitted over radio-frequency path 240 onto radio-frequency path 226 for transmission by antenna 40-1. Conversely, filter 234 may divide radio-frequency signals received by antenna 40-1 and radio-frequency path 226 between radio-frequency paths 241 and 240 based on the frequency band of the received signals. In this way, filter 234 may allow antenna 40-1 to handle multiple different frequency bands with minimal interference. The state of switch 250 may be adjusted based on whether antenna 40-1 or antenna 40-3 is transmitting LB signals 150LB.

Coupler circuitry 168 may include signal couplers 154 disposed on the radio-frequency paths for antennas 40-1 and 40-3. For example, a first signal coupler 154-1 may be disposed along (on) or coupled to radio-frequency path 218. A second signal coupler 154-2 may be disposed along or coupled to radio-frequency path 226. A third signal coupler 154-3 may be disposed along or coupled to radio-frequency path 222. Signal couplers 154-1, 154-2, and 154-3 may include transmission line structures, inductive structures, capacitive structures, transformers, or any other desired type of structures that couple signal off of radio-frequency paths 218, 226, and 222 for further processing (e.g., signal couplers 154-1, 154-2, and 154-3 may be transmission line couplers, inductive couplers, capacitive couplers, etc.).

Signal couplers 154-1, 154-2, and 154-3 may each include an isolated node termination and/or a coupled node termination. Signal couplers 154-1, 154-2, and 154-3 may each include a respective isolated node (terminal or port) coupled to the isolated node termination and a respective coupled node (terminal or port) coupled to the coupled termination. The isolated nodes may face antenna 40-1 or antenna 40-3 whereas the coupled nodes may face the transceiver circuitry. If desired, signal couplers 154-1, 154-2, and 154-3 may be switch-configured couplers that are able to measure the forward wave signals and the reverse wave signals along radio-frequency paths 218, 226, and 222, respectively. Signal couplers 154-1, 154-2, and 154-3 may, for example, include switches that selectively switch the isolated node termination or coupled node termination into or out of use for performing forward wave or reverse wave measurements (e.g., the state of the switches may be adjusted to switch from forward wave measurements to reverse wave measurements or vice versa). Forward wave and/or reverse wave measurements may be performed while generating S11, S33, S13, and S31 values (e.g., while processing the operations of FIG. 9).

Coupler circuitry 168 may also include one or more components disposed on feedback path 155. As shown in FIG. 10, coupler circuitry 168 may include, in feedback path 155, switching circuitry such as radio-frequency switches 288, 278, 276, and 272, attenuators such as attenuators 284 and 286, and filters such as LPF 280 and BPF 282. Feedback path 155 may also include switch 254. Switch 254 may have a first terminal 256 coupled to feedback receiver 152 (FIG. 8), a second terminal 258, a third terminal 260, and a fourth terminal 262. Terminal 258 may be coupled to terminal 270 of switch 268. Terminal 260 may be coupled to feedback path 264. Terminal 262 may be coupled to feedback path 266. Feedback paths 264 and 266 may be coupled to other coupler circuitry for other frequency bands and/or other antennas in device 10. Switch 254 may be, for example, a single-pole three-throw (SP3T) switch that selectively couples one of terminals 258, 260, and 262 to the feedback receiver at a given time.

Switch 268 may have a second terminal 272 and a third terminal 274. Switch 268 may, for example, be a single-pole double-throw (SPDT) switch that selectively couples one of terminals 272 or 274 to terminal 270 at a given time. Switch 288 may have a first terminal 290, a second terminal 292, and third, fourth, fifth, sixth, seventh, and eighth terminals respectively coupled to radio-frequency paths 294, 296, 298, 300, 302, and 304. Radio-frequency path 294 may be coupled to the coupled node (forward wave node) of signal coupler 154-3. Radio-frequency path 296 may be coupled to the isolated node (reverse wave node) of signal coupler 154-3. Radio-frequency path 298 may be coupled to the coupled node (forward wave node) of signal coupler 154-2. Radio-frequency path 300 may be coupled to the isolated node (reverse wave node) of signal coupler 154-2. Radio-frequency path 302 may be coupled to the coupled node (forward wave node) of signal coupler 154-1. Radio-frequency path 304 may be coupled to the isolated node (reverse wave node) of signal coupler 154-1. Switch 288 may be, for example, a dual-pole 6-throw (DP6T) switch for selectively coupling terminals 290 and 292 to radio-frequency paths 294-304. The state of switch 288 may be adjusted to perform forward wave or reverse wave measurements using signal couplers 154-1, 154-2, and 154-3.

Terminal 290 of switch 288 may be coupled to the input of attenuator 284. Terminal 292 may be coupled to the input of attenuator 286. Attenuators 284 and 286 may be, if desired, programmable attenuators that provide an adjustable amount of attenuation to the signals coupled off of radio-frequency paths 218, 226, and 222. The output of attenuator 284 may be coupled to the input of LPF 280 and the input of switch 276. Switch 276 may be a bypass switch that selectively switches LPF 280 into or out of use. The output of attenuator 286 may be coupled to the input of BPF 282 and the input of switch 278. Switch 278 may be a bypass switch that selectively switches BPF 282 into or out of use. The output of switch 276 and the output of LPF 280 may be coupled to terminal 272 of switch 268. The output of switch 278 and the output of BPF 282 may be coupled to terminal 274 of switch 268. Terminal 270 may be coupled to feedback receiver 152 (FIG. 8) through switch 254.

During LB transmission by antenna 40-1 (e.g., operations 180-194 of FIG. 9), antenna 40-1 may receive LB signals

150LB (FIG. 8) via radio-frequency path 241, switch 250, LPF 236, and radio-frequency path 226. Signal coupler 154-2 and radio-frequency paths 298 and 300 may couple forward wave and reverse wave signals from the transmitted LB signals off of radio-frequency path 226. The attenuators in coupler circuitry 168 may attenuate the forward and reverse wave signals, which are optionally filtered by the filters in coupler circuitry 168, and which are routed to the feedback receiver through switch 254.

Antenna 40-1 may transmit LB signals 150LB and some of the signals may be coupled onto antenna 40-3. The LB signals may pass through radio-frequency path 224 and LPF 217 to radio-frequency path 218. Switch 250 may couple load 252 and terminal 256 to terminal 244 (e.g., because antenna 40-3 is not actively receiving LB signals while antenna 40-1 transmits LB signals 150LB). Signal coupler 154-1 and radio-frequency paths 294 and/or 296 may couple the signals off of radio-frequency path 218. The coupled signals may pass through the remainder of feedback path 155 to the feedback receiver.

During LB transmission by antenna 40-3 (e.g., operations 200-210 of FIG. 9), antenna 40-3 may receive LB signals 150LB (FIG. 8) via radio-frequency path 241, switch 250, radio-frequency path 218, LPF 217, and radio-frequency path 224. Signal coupler 154-1 and radio-frequency paths 294 and 296 may couple forward wave and reverse wave signals from the transmitted LB signals off of radio-frequency path 218. The coupled signals may pass through the remainder of feedback path 155 to the feedback receiver.

Antenna 40-3 may transmit LB signals 150LB and some of the signals may be coupled onto antenna 40-1. The LB signals may pass through radio-frequency path 226 and LPF 236 to switch 250. Switch 250 may couple load 252 and terminal 256 to terminal 242 (e.g., because antenna 40-1 is not actively receiving LB signals while antenna 40-3 transmits LB signals 150LB). Signal coupler 154-2 and radio-frequency paths 298 and/or 300 may couple the signals off of radio-frequency path 226. The coupled signals may pass through the remainder of feedback path 155 to the feedback receiver. The example of FIG. 10 is illustrative and non-limiting. In general, RFFE 162 may include any desired circuit architecture for transmitting LB signals over antennas 40-1 and 40-3 and for coupling signals to the feedback receiver.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. Circuitry comprising:
- a first antenna fed by a first transmission line path;
- a second antenna fed by a second transmission line path;
- a first signal coupler disposed on the first transmission line path;
- a second signal coupler disposed on the second transmission line path;
- a feedback receiver coupled to the first signal coupler and the second signal coupler by a feedback path; and
- a low-pass filter disposed on the second transmission line path between the second signal coupler and the second antenna, wherein the feedback path comprises
  - a first switch communicatively coupled to the first signal coupler and the second signal coupler,
  - a second switch communicatively coupled to the feedback receiver, and
  - a component coupled between the first switch and the second switch, wherein the component comprises a bypassable filter or a programmable attenuator.

2. The circuitry of claim 1, further comprising:
- a switch having a first terminal coupled to the second transmission line path, the second signal coupler being disposed on the second transmission line path between the switch and the low-pass filter.

3. The circuitry of claim 2, wherein the switch has a second terminal coupled to the first transmission line path.

4. The circuitry of claim 3, further comprising:
- an additional low-pass filter disposed on the first transmission line path between the switch and the first signal coupler.

5. The circuitry of claim 4, further comprising:
- a radio-frequency transceiver, wherein the switch has a third terminal coupled to the radio-frequency transceiver.

6. The circuitry of claim 5, wherein the switch has a fourth terminal coupled to a termination load.

7. The circuitry of claim 6, wherein the switch is a double-pole double-throw (DPDT) switch.

8. The circuitry of claim 5, wherein the low-pass filter and the additional low-pass filter have a same cutoff frequency.

9. The circuitry of claim 5, wherein the radio-frequency transceiver is configured to transmit, using the first antenna, a radio-frequency signal in a frequency band, the electronic device further comprising one or more processors configured to:
- generate, using the second signal coupler and the feedback receiver, an S-parameter value characterizing over-the-air coupling of the radio-frequency signal from the first antenna onto the second antenna.

10. The circuitry of claim 9, wherein the radio-frequency transceiver is configured to use the second antenna to transmit the radio-frequency signal in the frequency band when the S-parameter value is within a predetermined range of S-parameter values, wherein the frequency band comprises a frequency between 600 MHz and 960 MHz.

11. Circuitry comprising:
- a first antenna fed by a first transmission line path;
- a second antenna fed by a second transmission line path;
- a first signal coupler disposed on the first transmission line path;
- a second signal coupler disposed on the second transmission line path;
- a feedback receiver coupled to the first signal coupler and the second signal coupler by a feedback path; and
- a low-pass filter disposed on the second transmission line path between the second signal coupler and the second antenna, wherein the feedback path comprises:
  - a first switch coupled to the first signal coupler and the second signal coupler,
  - a second switch coupled to the feedback receiver,
  - a first programmable attenuator coupled between the first switch and the second switch, and
  - a first bypassable filter coupled between the first programmable attenuator and the second switch.

12. The circuitry of claim 11, further comprising:

a second programmable attenuator coupled between the first switch and the second switch in parallel with the first programmable attenuator; and a second bypassable filter coupled between the second programmable attenuator and the second switch.

13. The circuitry of claim 12, wherein the first switch has a first terminal communicatively coupled to the first signal coupler, a second terminal communicatively coupled to the second signal coupler, a third terminal communicatively coupled to the first programmable attenuator, and a fourth terminal communicatively coupled to the second programmable attenuator.

14. The circuitry of claim 13, further comprising:

a third switch having a fifth terminal coupled to the second transmission line path, a sixth terminal coupled to the first transmission line path, and a seventh terminal, wherein the second signal coupler is disposed on the second transmission line path between the third switch and the low-pass filter; and transceiver circuitry communicatively coupled to the seventh terminal.

15. The circuitry of claim 1, further comprising:

a switch having a first terminal coupled to the first transmission line path, a second terminal coupled to the second transmission line path, and a third terminal coupled to a termination load, wherein the second signal coupler is disposed on the second transmission line path between the low-pass filter and the second terminal of the switch.

16. Circuitry comprising:

a first antenna fed by a first transmission line path;

a second antenna fed by a second transmission line path;

a first signal coupler disposed on the first transmission line path;

a second signal coupler disposed on the second transmission line path;

a feedback receiver coupled to the first signal coupler and the second signal coupler by a feedback path;

a low-pass filter disposed on the second transmission line path between the second signal coupler and the second antenna; and one or more processors, wherein:

the first antenna is configured to transmit a radio-frequency signal in a frequency band, and the one or more processors are configured to output, using the feedback receiver and the and the second signal coupler, a scattering parameter value characterizing over-the-air coupling of the radio-frequency signal from the first antenna onto the second antenna.

* * * * *